May 30, 1950     E. M. DELORAINE     2,509,218
REPEATER LINK SYSTEM
Filed April 20, 1944     11 Sheets-Sheet 1
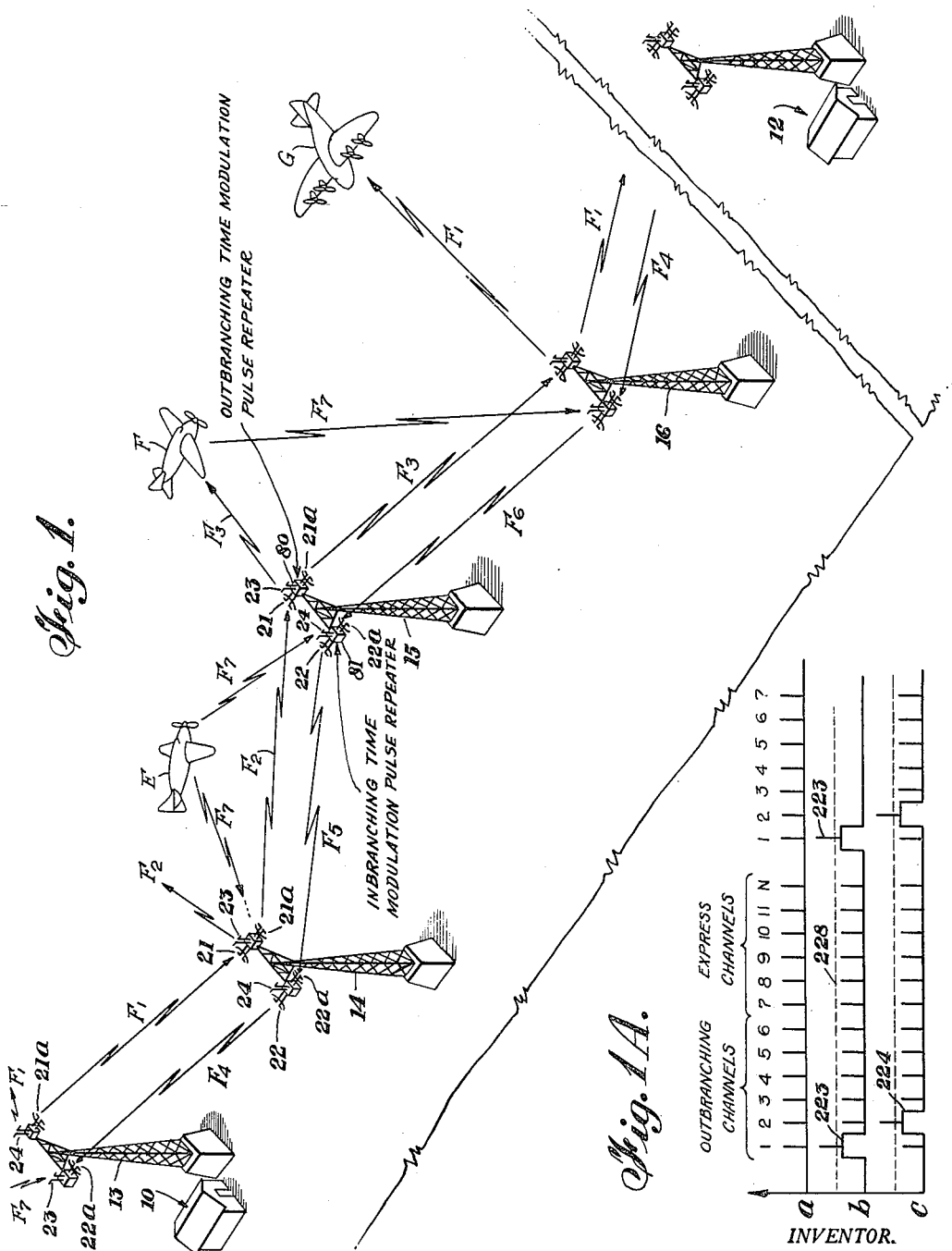
INVENTOR.
EDMOND M. DELORAINE
BY
ATTORNEY

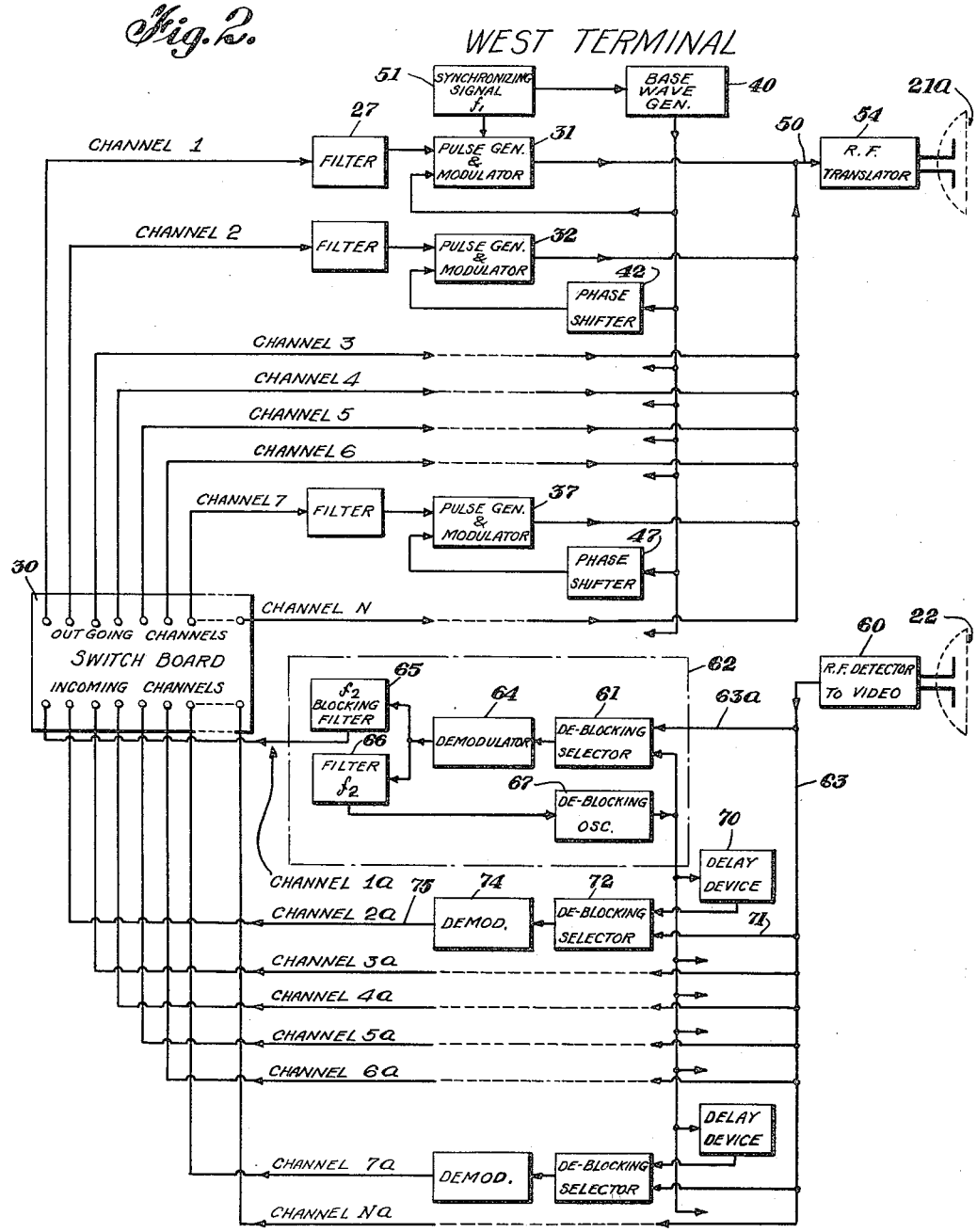

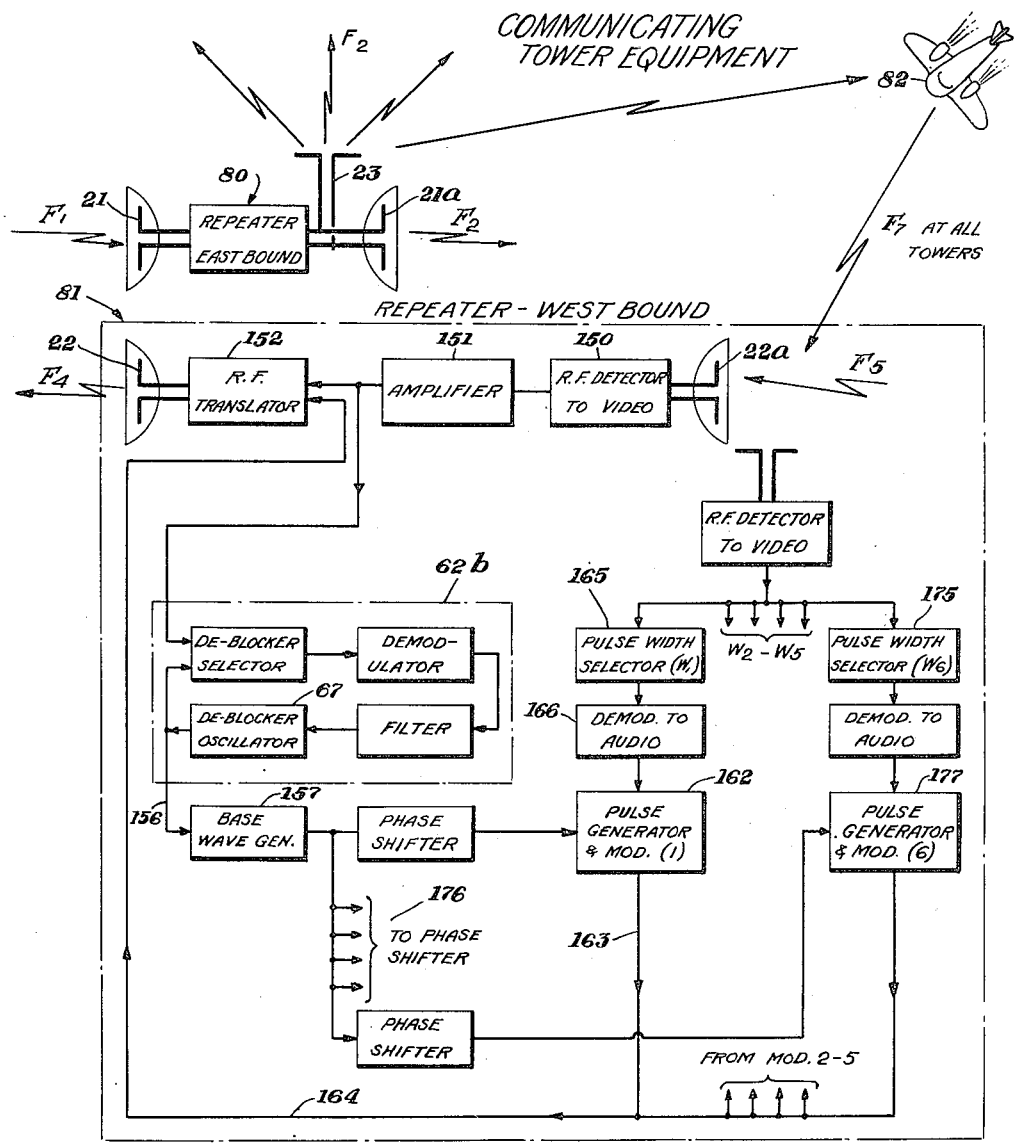

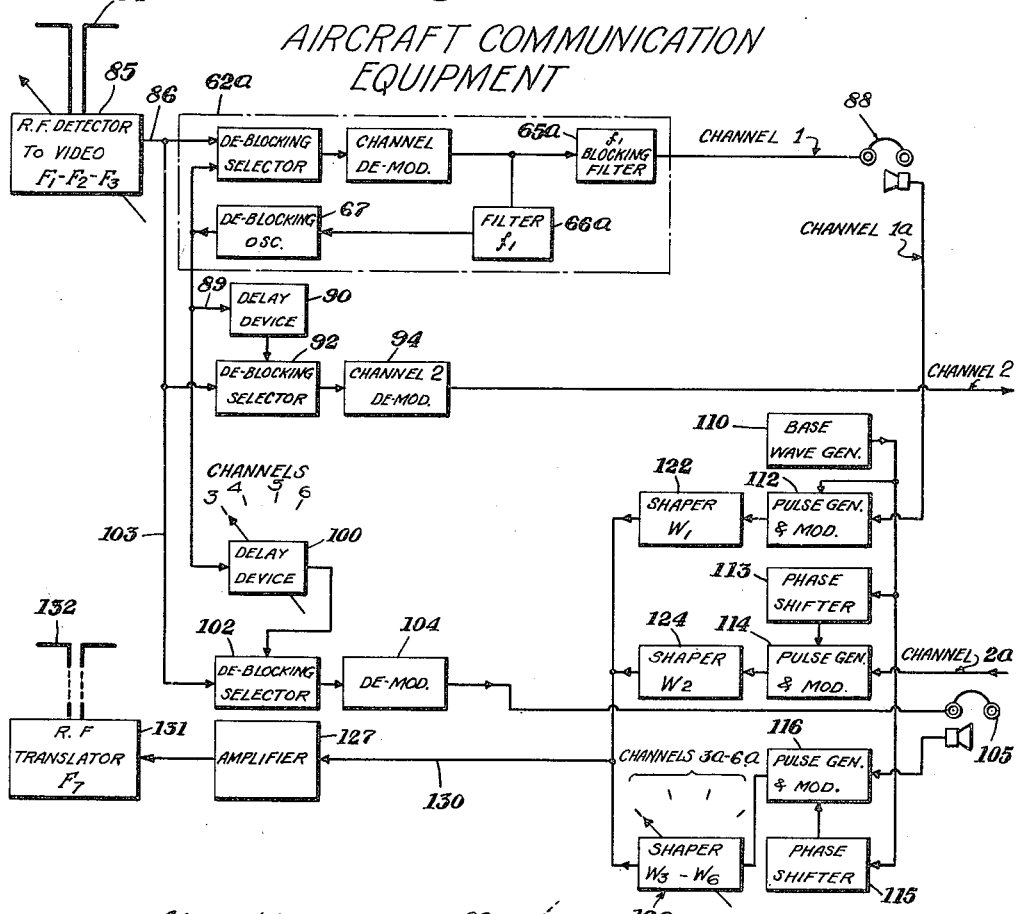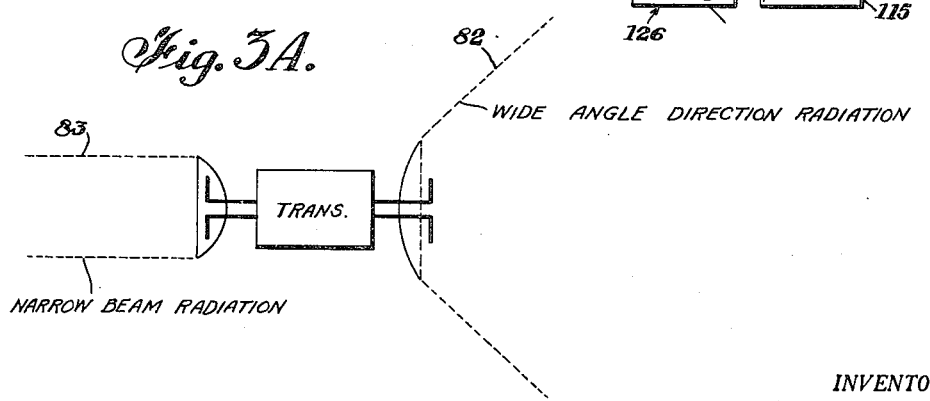

May 30, 1950  E. M. DELORAINE  2,509,218
REPEATER LINK SYSTEM
Filed April 20, 1944  11 Sheets-Sheet 5

INVENTOR.
EDMOND M. DELORAINE
BY
ATTORNEY

May 30, 1950  E. M. DELORAINE  2,509,218
REPEATER LINK SYSTEM
Filed April 20, 1944  11 Sheets-Sheet 6
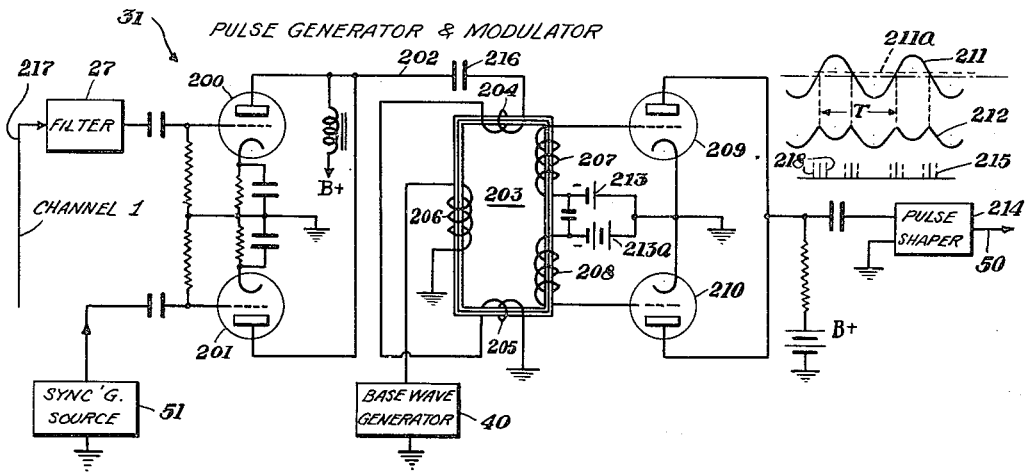
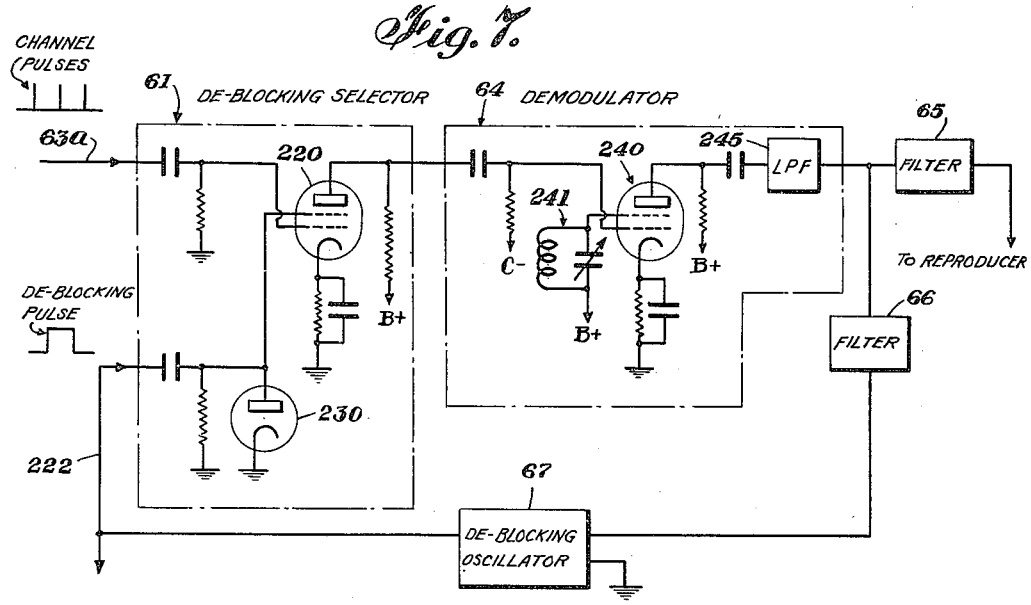
INVENTOR.
EDMOND M. DELORAINE
BY
ATTORNEY May 30, 1950 E. M. DELORAINE 2,509,218
REPEATER LINK SYSTEM
Filed April 20, 1944 11 Sheets-Sheet 7
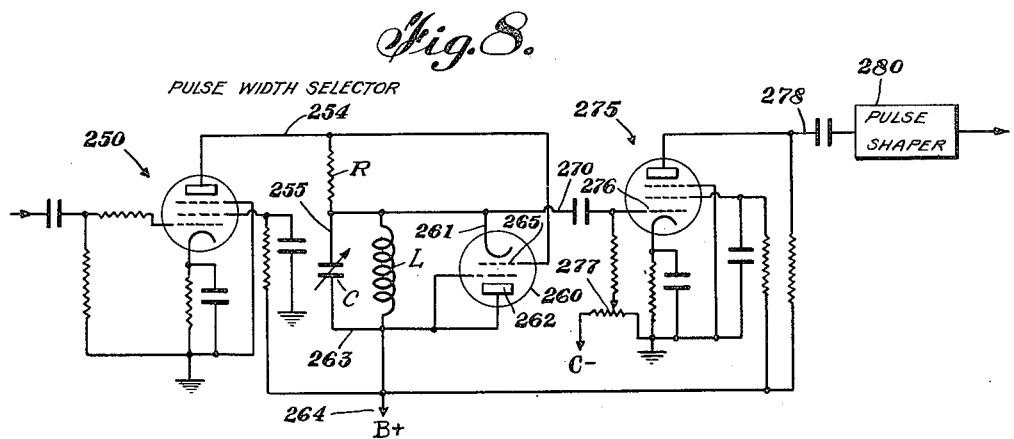
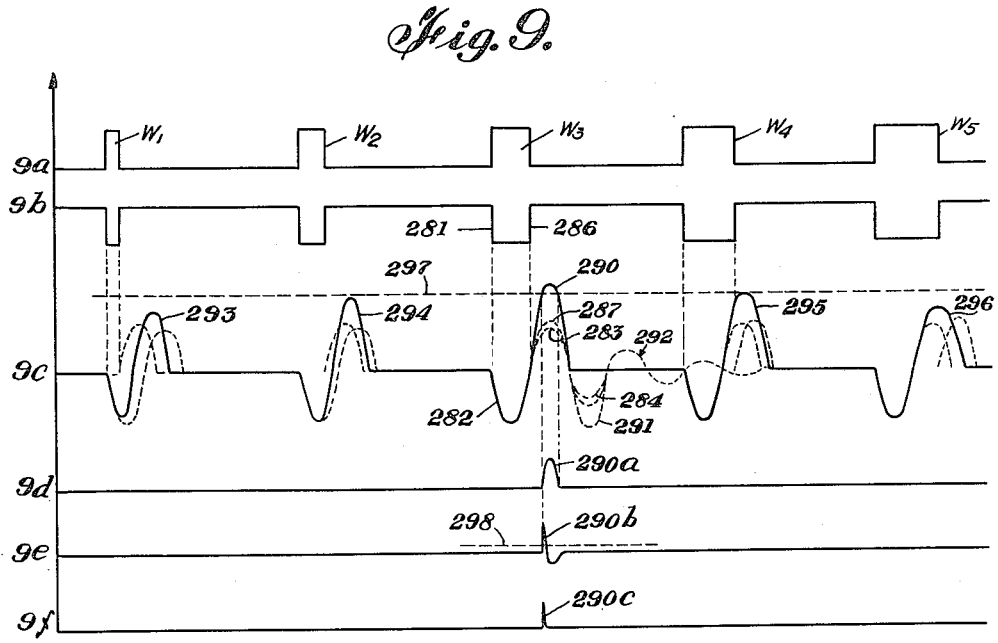
INVENTOR.
EDMOND M. DELORAINE
BY Percy P. Lantzy
ATTORNEY May 30, 1950     E. M. DELORAINE     2,509,218
REPEATER LINK SYSTEM
Filed April 20, 1944     11 Sheets-Sheet 8

INVENTOR.
EDMOND M. DELORAINE
BY
*Percy P. Lautzy*
ATTORNEY

May 30, 1950 — E. M. DELORAINE — 2,509,218
REPEATER LINK SYSTEM
Filed April 20, 1944 — 11 Sheets–Sheet 9

INVENTOR.
EDMOND M. DELORAINE
BY Percy P. Lantzy
ATTORNEY

May 30, 1950 E. M. DELORAINE 2,509,218
REPEATER LINK SYSTEM
Filed April 20, 1944 11 Sheets-Sheet 10
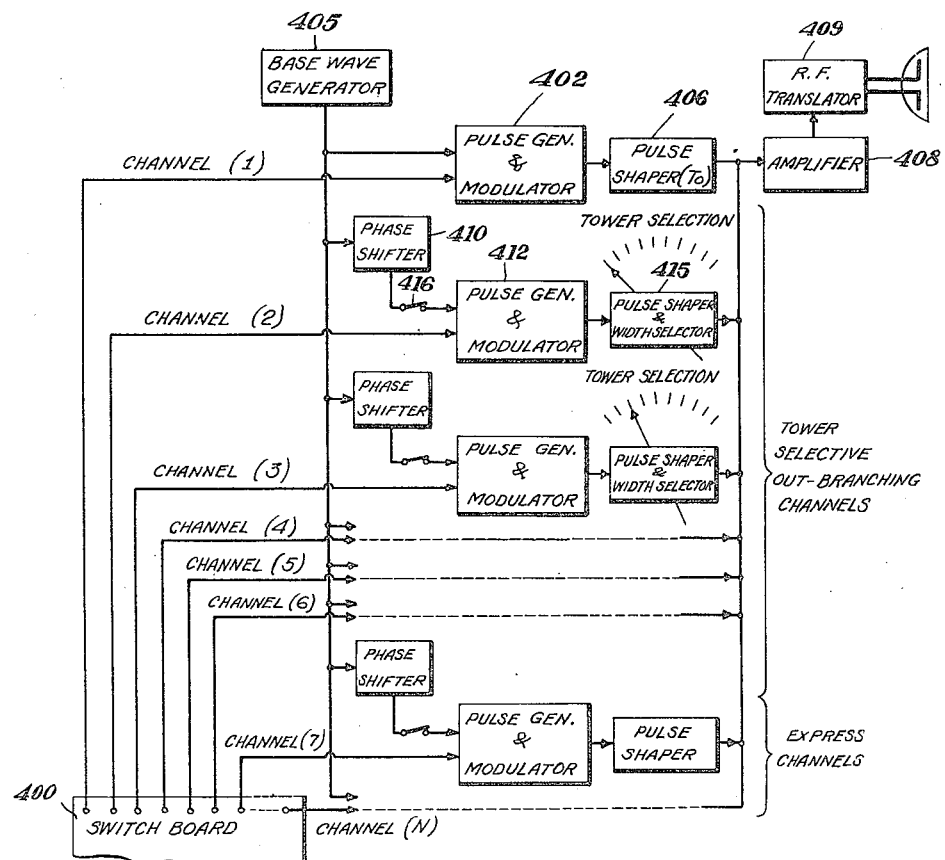
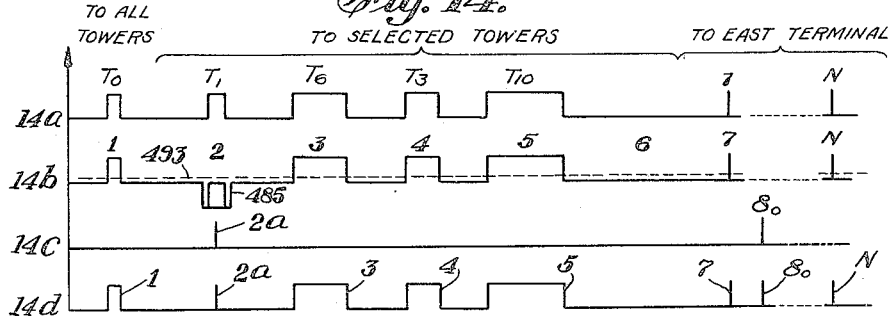
INVENTOR.
EDMOND M. DELORAINE
BY
ATTORNEY May 30, 1950     E. M. DELORAINE     2,509,218
REPEATER LINK SYSTEM
Filed April 20, 1944     11 Sheets-Sheet 11
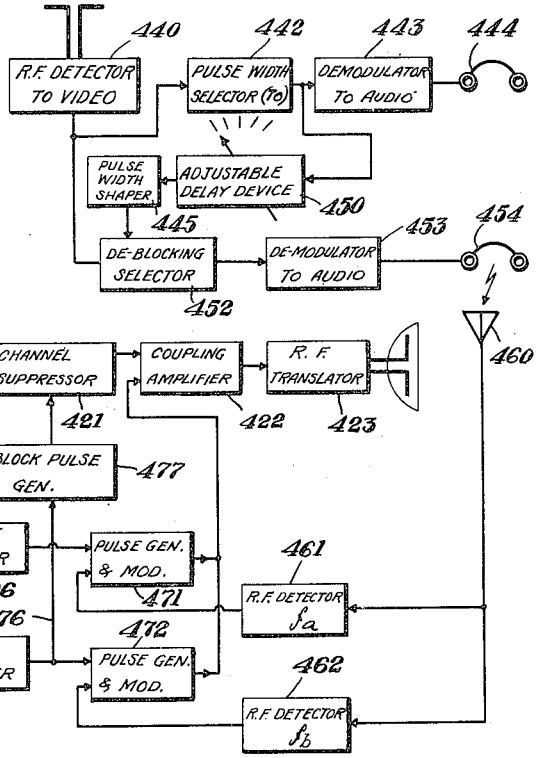
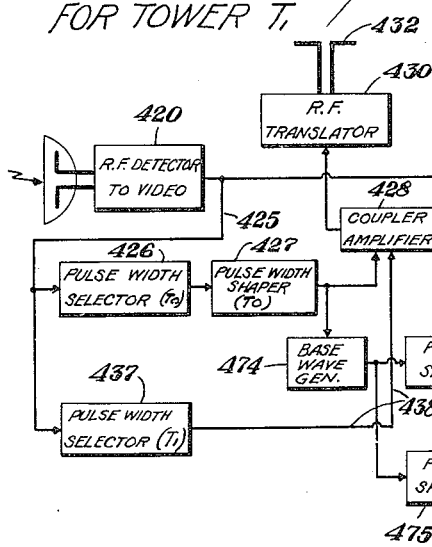
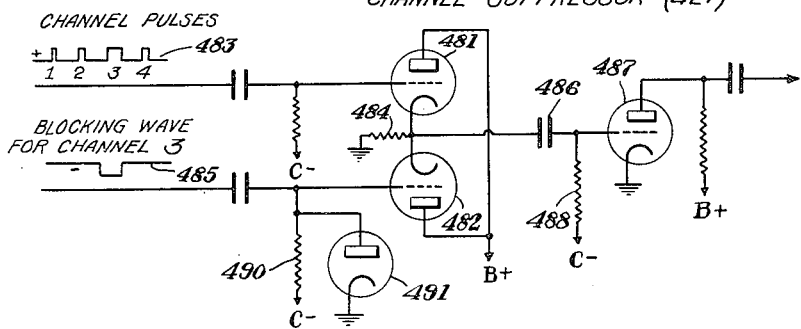
INVENTOR.
EDMOND M. DELORAINE
BY Percy P. Lantry
ATTORNEY

Patented May 30, 1950

2,509,218

UNITED STATES PATENT OFFICE 2,509,218

REPEATER LINK SYSTEM

Edmond M. Deloraine, New York, N. Y., assignor to Federal Telephone and Radio Corporation, New York, N. Y., a corporation of Delaware Application April 20, 1944, Serial No. 531,851

44 Claims. (Cl. 250—9)

This invention relates to communication systems and more particularly to a radio multichannel communicating system particularly adapted for association with predetermined routes for aircraft, ships, railroad trains, automobiles and other vehicles with which communication may be desired.

One of the objects of this invention is to provide a radio communicating system and method capable of communication with vehicles travelling generally along a chain of relay stations forming the line of communication between given terminals of the system.

Another object is to provide a radio multichannel communicating system and method utilizing a chain of relay stations of such character that communication may readily be had between the terminals or other points in the system and one or more vehicles moving generally along the line of relay stations, either together on the same channel or selectively on different channels, or communication may be had between any two of such vehicles, the path of transmission therebetween including at least part of the relay stations of the system.

Another object is to provide a multi-channel communication system and method utilizing a chain of relay stations disposed along the path of vehicular travel by which channels can be selectively transmitted to selected relay stations where they are transmitted at broad angle radiation for reception by a nearby vehicle, and further to thereafter suppress the pulses in the relay equipment and insert reply channel pulses in the positions left by the suppressed pulses.

Another object is to provide a relay method and means for multi-channel communicating systems capable of repeating with directivity a plurality of channels of communication and for broadcasting at least certain of the channels for local reception and/or for suppressing certain outbranching channels and/or for inserting inbranching channels of communication into the communicating system.

Still another object of the invention is to provide a channel inserting circuit for multi-channel communicating systems for inserting one or more series of pulses, each series representing a channel of communication, in predetermined intervals in a train of multi-channel pulses.

A further object of the invention is to provide a translator circuit for multiplex signalling systems capable of segregating the signals received simultaneously from different sources and of translating the different signals into a characteristic modulation of pulses representing different channels of communication.

A still further object of the invention is to provide a transmitter-receiver unit for multichannel communicating systems capable of receiving designated channels of communication and for selectively transmitting in other channels of the system.

While this invention is applicable for communication with various types of vehicles, it is particularly adaptable for use in connection with aircraft. The relay stations of the system are located at spaced points along a predetermined range or airway provided for guiding aircraft. The relay stations are preferably directive in character and are located apart in optical distances of 20 or 30 miles more or less, whereby low-powered transmission in the order of 1 to 2 watts in the ultra high frequency range is possible. Each relay station includes circuits for broadcasting at least certain of the channels, either simultaneously or selectively, for reception by nearby aircraft in flight along the airway, and means for receiving messages transmitted from the aircraft and for inserting the messages in appropriate channels in the system. Each aircraft has a simple lightweight transmitter-receiver unit for reception of the channels broadcast from the relay stations and for transmitting messages for insertion in selected channels of the system. The channels of communication are preferably controlled at a given terminal where, by means of an order channel, aircraft and the next succeeding terminal station of the system can be called in for communication on selected channels. The aircraft, of course, are also provided with an order channel over which they may request a channel for communication and over which navigation data may be supplied from time to time.

It will be readily apparent that the communication system of this invention is readily applicable for numerous uses in addition to the communicating feature, for example, the system may be used for controlling the radio range required for guiding aircraft, for registering at a terminal the location of aircraft in flight, controlling the landing and traffic of aircraft, transmitting navigation data and control signals for aircraft in flight, etc. The instant application, however, is concerned mainly with the communicating features whereby communication may be had between aircraft and terminals or other points in the system.

For a more complete understanding of the invention, reference may be had to the following detailed description to be read in connection with the accompanying drawings, in which:

Fig. 1 is a diagrammatical view in perspective showing two terminals of the multi-channel communicating system together with a chain of relay stations therebetween and showing aircraft in flight along the line of relay stations;

Fig. 1A is a graphical illustration of a train of pulses which represent the different channels transmitted from the west base, and also the manner by which the channel pulses are monitored at receiver equipment;

Fig. 2 is a block diagram of the west base terminal of the system;

Fig. 3 is a block diagram of the tower equipment for those relay stations at which channels are to be broadcast and messages inserted into the train or trains of channel pulses;

Fig. 3A is a diagrammatical showing of two different angle directive radiation antennas that may be employed in the system;

Fig. 4 is a block diagram of the transmitter-receiver unit for aircraft and other vehicles;

Fig. 6 is a wiring diagram of a time modulator of a character that may be used in the system;

Fig. 7 is a wiring diagram of a selector and demodulator equipment that may be used in the system;

Fig. 8 is a circuit diagram of a pulse width selector that may be used in the translator portion of the tower equipment of Fig. 3;

Fig. 9 is a graphical illustration used for explaining the operation of the pulse width selector of Fig. 8;

Fig. 13 is a block diagram of a terminal equipment for a further modification of the system whereby channels may be selected for a given aircraft and for broadcasting at a given relay station or block of relay stations;

Fig. 14 is a graphical illustration of channel pulses according to the principles of the embodiment shown in Fig. 13;

Fig. 15 is a block diagram of tower equipment that may be used for the selective broadcasting of channel pulses, the suppressing of channel pulses in the train of channel pulses and the inserting of channel pulses into the train;

Fig. 16 is a block diagram of a receiver for aircraft in coordination with the broadcasting feature of Fig. 15; and Fig. 17 is a schematic wiring diagram of the channel suppressor used in Fig. 15.

Figure 5:
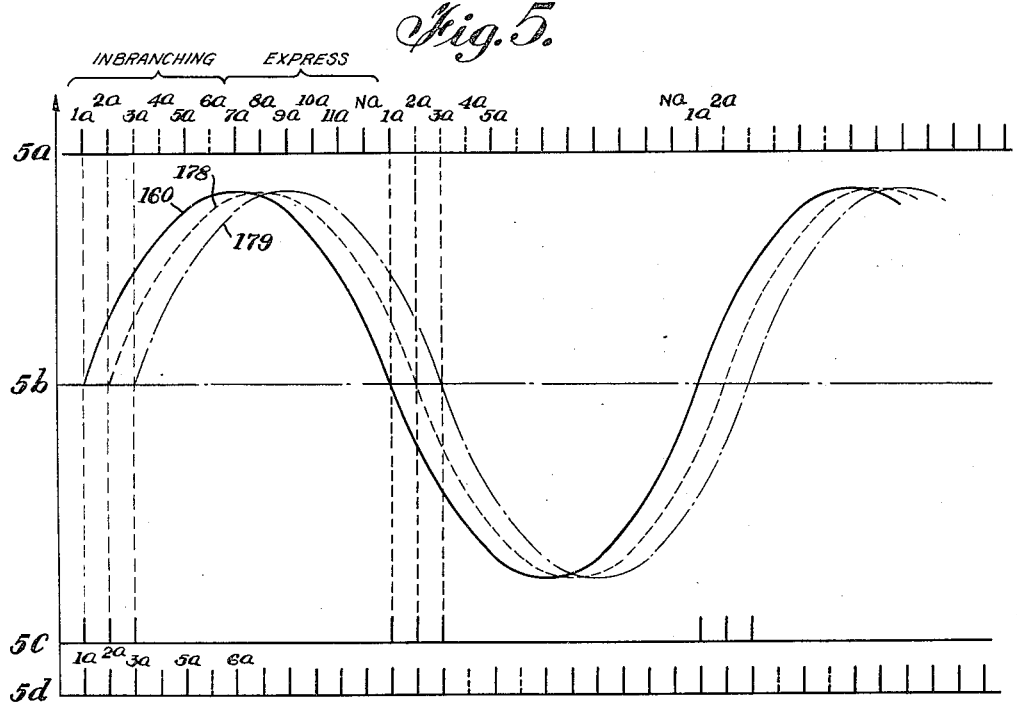
Fig. 5 is a graphical illustration of a train of pulses representing different channels as received at a given relay station and also a graphical indication of how pulses of additional channels are inserted into the train of channel pulses.

Referring to Figs. 1 and 1A, two terminals 10 and 12 (west and east) are shown interconnected by a chain of relay towers or stations 13, 14, 15, etc. Each tower, particularly the towers between terminals, is provided with a plurality of antennas, antennas 21, 21a and 22, 22a being directional as indicated while antennas 23 and 24 are preferably broad angle radiators, antennas 23 being used for broadcast radiation of channels to nearby aircraft and antennas 24 for reception of signals from aircraft. The directional antennas 21, 21a and 22, 22a are associated with east bound and west bound repeaters, respectively, for repeating channels of communication from tower to tower by narrow beam radio waves, successive frequencies $F_1$, $F_2$ and $F_3$ being used for east bound transmission and frequencies $F_4$, $F_5$ and $F_6$ for west bound transmission as indicated in Fig. 1. In the first embodiment of the invention, the antennas 23 are employed for broadcasting on the same outgoing frequency ($F_1$, $F_2$ and $F_3$) as the transmitting antennas 22a. The receiving antennas 24, however, are for wide angle pick-up of radio waves on frequency $F_7$.

While the east bound channels are shown in curve $a$, Fig. 1A, for example, as consisting of twelve series of very brief pulses, it will be understood that a greater or lesser number of channels may be used as desired, the pulses of each series being time modulated and so timed or phased from channel to channel that the pulses of the twelve series interleave together to form a single train of channel pulses. The separate pulses may be of any desired width such as one-tenth of a microsecond or one microsecond, or larger, depending upon the band width, number of channels and power consumption permissible. The narrower the pulse the wider the band width required, although a larger number of channels is then permissible. The wider the pulse the greater is the average power consumption for a given peak power. It will thus be understood that for a given pulse recurrence rate per channel, say a pulse every 80 microseconds for example, more than 100 channels may be provided including an allowance of as much as one-half a microsecond displacement interval per pulse for time modulation.

The west bound train of channel pulses utilizing frequencies $F_4$, $F_5$ or $F_6$, as the case may be, can be similar to that of the east bound train of channel pulses, but preferably it includes, in addition to the twelve channels of communication, a gap for insertion of at least six inbranching channels from aircraft. It will be understood, of course, that many more channels may be selected than the twelve given here by way of example, the spacing between pulses of adjacent channels for a number larger than twelve being reduced accordingly.

If desired, one of the channels may be used for facsimile transmission of maps, news, etc. For example, pulses may be transmitted as facsimile signals, the pulses of a selected channel being used directly as the facsimile build-up characters.

It will also be understood that while I disclose my communication system as a pulse system to illustrate the principles of my invention, I do not intend to so limit my invention. For example, not only different forms of pulsing systems may be employed, but also A.M. and F.M. modulated carrier wave systems might be employed by using an appropriate selection of frequencies and/or sub-carriers.

For the present example, let it be supposed that the first six of the east bound channels and the first six of the west bound channels are required for two-way communication between the west terminal 10 and aircraft. The channels 7 to 12, both east bound and west bound, will then provide through communication between terminals, and may be referred to as "east bound express channels" and "west bound express channels," respectively. The channels 1 to 6 for transmission to and from aircraft may be referred to as "east bound branching channels" and "west bound branching channels," respectively. The No. 1 channel (Fig. 2) is preferably used as a synchronizing, monitoring and as an order channel, while channels 2 to 6 may be used for communicating purposes in the manner of party telephone lines as regards the aircraft in flight between terminals.

Referring to Fig. 2, the west terminal is shown to include a switchboard 30 containing jack connections for outgoing and incoming channels 1—N and 1a—Na, respectively. The switchboard is of known character provided for connecting telephone circuits or trunk lines to the proper channel jacks and also for connecting together incoming and outgoing channels under certain circumstances described hereinafter. Channel 1 includes a modulator 31 the input connection of which includes a filter 27 the function of which is described in connection with Fig. 6. The modulator 31 and also modulator 32 to the modulator for channel N may be of any desired type but are preferably of the character for producing "push-pull" time displacement modulation of pulses. In order to effect this time modulation, energy from a base wave source 40 is applied over individual phase shifters 42—47, etc., for channels 2 through N, respectively. Channel 1 need not have an individual phase shifter since the phase of the wave from source 40 may be applied directly without phase shift to the modulator 31. The phase shifters for the other channels are adjusted so that the individual trains of pulses for the separate channels will be displaced in time to provide a single resultant train in the common output 50 as indicated by the train of pulses of curve $a$, in Fig. 1A.

Channel 1 has been chosen as the synchronizing and monitoring channel as indicated by the connection of a source 51 of synchronizing signals to modulator 31. The source 51 supplies energy to the modulator at a frequency $f_1$ which imposes a given tone or time displacement on the pulses of channel 1 so as to distinguish channel 1 from all of the other outgoing channels. The synchronizing frequency $f_1$ is distinguished from intelligence signals applied to the modulator by means of filter 27 which operates to exclude from the signals the synchronizing frequencies chosen as the synchronizing signal. Other synchronizing frequencies, as will be seen hereinafter, may be applied to other channel modulators for drop channel and other monitoring purposes.

All the trains of pulses produced by the different channel modulators (31 to N) are combined, as indicated by the output connection at 50, and applied to an R.-F. translator 54 and radiated by transmitting antenna 21a. The R.-F. translator in this instance will provide a carrier wave of frequency F₁ as indicated in Fig. 1. This train of multiplex channel pulses is east bound, channel 1 operating as a synchronizing and monitoring channel for controlling the separation of channel pulses at the receiver whether in a plane or at the east terminal 12.

Before discussing the equipment and operation of the relay stations, let it be assumed insofar as the west base is now concerned that a west bound train of channel pulses 1a, 2a, 3a - - - Na is being received on antenna 22, Fig. 2, and that the pulses thereof are detected into video form at receiver 60. The video pulses of the incoming channels are applied to a deblocking selector 61 of a synchronizing and monitoring unit 62. The video pulses passed by the selector 61 are applied to a demodulator 64 the output of which is applied to filters 65 and 66. Assuming that the pulses of channel 1a are modulated with a synchronizing frequency $f_2$, filter 65 will operate as an $f_2$ blocking filter while filter 66 will operate to pass frequency $f_2$ and exclude signal frequencies with which channel 1 may be moduated. The output of filter 66 is applied to a deblocking oscillator 67 which serves to produce timed pulses preferably of substantially rectangular form for application to a deblocking selector 61.

Preferably, the deblocking oscillator 67 is normally timed to provide a pulse timing slightly greater than the interval spacing of the pulses of any one channel. Consequently, when the pulses arrive at the deblocking selector 61 they are selected in rotation until such time as channel 1a is received. Upon receipt of channel 1a, the demodulator 64 produces an output tone corresponding to frequency $f_2$ with which channel 1a is modulated. This synchronizing frequency is selected by filter 66 and serves to synchronize the deblocking oscillator 67 which thereupon produces a deblocking pulse (see rectangular pulse 223, Fig. 1A) which is timed according to the occurrence of the pulses of channel 1a. Thus, the progression of selection is halted and the selected channel (channel 1a) is continuously received thereafter by selector 61. An understanding of the details of this particular selector arrangement is not necessary to a complete understanding of our invention and is therefore not set forth in detail herein although further explanation is given later in connection with Fig. 7. For a more complete understanding of this feature, reference may be had to the copending application of D. D. Grieg, entitled "Multiplex synchronizing system," Serial No. 514,998, filed December 20, 1943 now Patent No. 2,418,116 issued April 1, 1947.

Energy from the deblocking oscillator 67 is also applied to the deblocking selectors of the other receiving channels, the energy being applied through suitable delay devices for proper timing. Referring to channel 2a, for example, the deblocking pulse produced by the deblocking oscillator 67 is applied to a delay device 70 and thence to deblocking selector 72 where it controls the selection of the pulses of channel 2a as received over line 71, the selector excluding all other channel pulses. This is illustrated by deblocking pulse 224 in Fig. 1A as described hereinafter in more detail in connection with Fig. 7. The channel pulses passed by the selector 72 are applied to demodulator 74 whereby the time displacement of the video pulses is translated into an audio signal wave which in turn is applied over line 75 to the proper jack on the switchboard 30. This selector control is the same for the additional channels 3a to Na and therefore need not be illustrated or described in detail.

The tower communicating equipment is shown as blocks 80 and 81 in Figs. 1 and 3. Each repeater includes an R.-F. detector, amplifier and R.-F. translator as indicated, for example, by blocks 150, 151 and 152 in the illustration of repeater 81, Fig. 3. The block 80 comprises the repeater equipment for east bound channels the repeater being associated with input antenna 21 and output antenna 21a. For purposes of broadcasting the branching channels, antenna 23 may be connected directly to the terminals of antenna 21a with proper impedance matching, of course. This arrangement will broadcast all of the pulses regardless of whether or not they are branching or express channels. It may be desired to provide the equipment 80 with separate transmitting means whereby only the branching channels are broadcast or where selected ones of the branching channels are broadcast. This selective feature, however, is the subject matter of a modification of the invention hereinafter described.

The antennas 21a and 23 may be replaced by a single wide angle directional antenna. That is to say, the transmitting antenna would in such case have a wide angle directional radiation like that indicated at 82 in Fig. 3A, so that aircraft may receive the signals when flying forward of the antenna. Radiation 83 is illustrative of a narrow angle directional beam normally preferred between repeater stations. These antenna indications are, of course, diagrammatical since antenna arrays and structure for producing different angle beams are well known.

Referring now to Fig. 4, the channel pulses broadcast from the antenna 23 may be detected on antenna 84 of an R.-F. detector 85 comprising a part of the aircraft communicating equipment. The R.-F. detector 85 is tunable, at least between frequencies $F_1$, $F_2$ and $F_3$, whereby the operator can readily switch from one carrier to the next as the aircraft moves from the range of one relay station into the range of the next. The output 86 of the detector 85 is applied to a synchronizing and monitoring unit 62a substantially identical to the form 62 illustrative in Fig. 2. The only difference is that the blocking filter 65a is adjusted to block frequencies $f_1$ while filter 66a is adjusted to pass the frequencies $f_1$. As described in connection with the unit 62 of Fig. 2, the deblocking oscillator 67 ties in with the synchronizing pulses of channel 1 so that the earphones 88 receive the intelligence signals with which channel 1 may be modulated. The deblocking pulses (rectangular pulses 223, Fig. 1A) of the deblocking oscillator 67 are applied over connection 89 to delay device 90 to provide delayed deblocking pulses (pulses 224, Fig. 1A) having the proper timing for deblocking selector 92 for reception of the pulses of channel 2. The selector 92 thus passes the pulses of channel 2 to demodulator 94 whereupon the pulses are translated into amplitude modulated signal waves for reception at the usual reproducer.

Channels 3 to 6 may be banked for selective demodulation by an adjustable delay device 100. The devices 90 and 100 preferably are of a known pulse translation type rather than the weighty network type. The adjustment of device 100 at indication 3 infers that the device provides the necessary time delay to give the deblocking pulse the timing required for the pulses of channel 3. The output of the device 100 is applied to a deblocking selector 102 to which the incoming video pulses are applied over connection 103. The selector thus passes, for the present adjustment of device 100, the pulses of channel 3 which are demodulated at demodulator 104, the output of which is applied to phones 105. By adjusting the delay device to indication 4, the pulses of channel 4 will be selected and demodulated. Likewise, adjustment to indications 5 and 6 will cause the pulses of channels 5 and 6 to be demodulated, respectively.

For communicating back from the aircraft to the multi-channel system, a base wave generator 110 is provided for applying a base wave to the modulators 112, 114 and 116. The wave to modulators 114 and 116 must be shifted relative to the wave applied to modulator 114 by phase shifters 113 and 115 in order to time the output of the different modulators for interleaving of the pulse transmission. In the present form, the modulators are indicated as pulse modulators and the output of the modulators 112, 114 and 116 is applied to pulse shapers 122, 124 and 126, respectively. The shaper 122 is adjusted to produce a given pulse width $W_1$, shaper 124 is adjusted to give a different pulse width $W_2$ and shaper 126 is made adjustable to give a selection of pulse widths $W_3$ to $W_6$. These different pulse widths which may differ by as small as one hundredth of a microsecond distinguish the pulses of the six channels 1a to 6a. The common output 130 from the shapers 122, 124 and 126 is applied to an R.-F. translator 131 through a suitable amplifier 127, to transmit the pulses on carrier $F_7$ over antenna 132. It will be noted that in Fig. 4 the aircraft equipment is arranged for simultaneous communication over three channels. In some instances, no more than two channels are necessary for simultaneous operation and in such cases the additional equipment for channel 2 may be omitted and an additional adjustment provided on the delay device 100 and shaper 126 to include channel 2. This then would leave a continuous indication for channel 1 and selective communication over channels 2 to 6. Channel 1 will always be in operation so that it not only operates to synchronize the reception of the equipment but also to provide an order channel over which the operator at a terminal station may order the plane to communicate over a specified channel. The order channel may also be used for supplying navigation data and traffic control instructions where the channel is not loaded with order requests. Should the route over which the aircraft travel be of a character requiring that navigation data and instructions be given over a separate channel, then channel 2 as shown in Fig. 4, separate from the selective feature of devices 100 and shaper 126, will be desirable.

Referring back to Fig. 3, the repeater block 81 for the west bound channels is shown to comprise an R.-F. detector 150, amplifier 151 and R.-F. translator 152 for repeating the train of channel pulses along the directive radiation path of the system together with associated equipment for receiving signals from an aircraft and inserting the signals in the form of pulses into appropriate intervals in the train of channel pulses relayed by units 150, 151 and 152. In order to effect the insertion synchronously into the train of channel pulses, a synchronizing pulse such as represented by channel 1a from east terminal 12 is selected by unit 62b. Pulse energy is fed in video form from the output of amplifier 151 to the synchronizing unit 62b. The unit 62b is substantially the same as the unit 62 of Fig. 2 except the filter 65 is omitted since there is no point in extracting the audio or other signals of channel 1. The deblocking pulse produced by the oscillator 67 is applied over connection 156 to a base wave generator 157 whereby a base wave is produced in synchronism with the synchronizing pulses of channel 1a.

Curve 5a of Fig. 5 illustrates the train of channel pulses relayed by the repeater station 81. The pulse 1a represents the synchronizing channel as well as the order channel to be used at the aircraft. Channels 2a through 6a represent the inbranching channels for communication from aircraft. The channel pulses 7a through Na represent express channels west bound from terminal 12 to terminal 10. A base wave 160 is produced by generator 157 in synchronism with the channel pulses 1a as shown by curve 5b. The wave 160 may therefore be used as the base wave for the modulator 162 for insertion of the aircraft order channel signals 1a. It will be understood, of course, that the order channel is not in continuous use but may serve a large number of aircraft in flight even though there may be some overlapping of conversations.

Since the channels transmitted by aircraft in flight are distinguished by a pulse width, the different channels may be segregated by means of pulse width selectors. The pulse width $W_1$, for example, is segregated from the other pulse widths by selector 165 which may be of any known pulse width discriminating circuit but preferably is of the character illustrated in detail in Fig. 8, the details of which are described hereinafter. The pulses of width $W_1$ being thus segregated from the others may be demodulated to an audio wave by demodulator 166 and applied to the pulse generator and modulator 162 for insertion in the train of channel pulses at translator 152. This insertion is accomplished by output connection 163 and common input connection 164 to translator 152 in known manner. The other channels of communication from aircraft to relay station are likewise segregated by other pulse width selectors such as selector 175 for pulse width $W_6$. Since the position for channel 6a as well as channels 2a to 5a are different from channel 1a, phase shifters as indicated at 176 are required for proper phasing of the base wave provided for the modulators of such channels.

The phase shift for the base wave for channels 2a and 3a is represented by the waves 178 and 179, curve 5b. The pulses inserted by the waves 160, 178 and 179 are indicated by curve 5c. 5d represents the channel pulses as transmitted over antenna 22a from the repeater 81. It will be noted that at this point in the chain of repeaters that branching channels 1a, 2a, 3a and 5a are now occupied. Channels 4a and 6a are unoccupied and may be assigned to other aircraft for communication with the base terminal or other point in the system.

From the foregoing description, it will be clear that outbranching channels 1 to 6, Fig. 1A, are radiated at a broad angle at the relay stations or at certain of the stations since, obviously, it will not be necessary that the outbranching channels be broadcast every 20 or 30 miles along the line of communication. The relay stations along the lines at which broadcasting of the outbranching channels are desirable will depend, to a large extent, upon the terrain and the power at which such broadcasting is to be made. These outbranching channels are selectively receivable by the aircraft equipment and return channels of communication and are transmitted from the aircraft to the relay stations for insertion into the train of west bound channel pulses. The detection of return channels from the aircraft and the synchronizing of the insertion at the relay station avoid interference overlapping of channel pulses by inbranching channel pulses at the base terminal. This is true regardless of the fact that two or more relay stations may receive the same inbranching channels from a given aircraft. This double or triple reception of the same signals by two or more relay stations means that the overlapping relation to pulses for a given signal have only a very small difference in time, and such difference is so slight as to be negligible insofar as the time modulation of the pulses is concerned.

In order more clearly to disclose the structural examples of a pulse generator and modulator suitable for use in the transmitter circuits of Figs. 2, 3 and 4, reference may be had to the circuit diagram of Fig. 6. Signal energy for channel 1, Fig. 2, for example, is applied over a filter 27 to modulating circuit 31, the output of which is coupled to the outgoing line 50. The filter 27 in the grid circuit to coupling tube 200 is tuned to exclude from the audio input to the modulator the synchronizing frequencies selected at source 51. Simultaneously, synchronizing modulations from source 51 are applied to a second coupling tube 201. The outputs of these tubes are combined in line 202 producing a resultant mixing of the signals and synchronizing frequencies. This resultant mixed wave is applied over separate transformer windings 204 and 205 to a mixing transformer arrangement 203. Condenser 216 serves to remove the direct current from the primary winding. Simultaneously, energy from base wave generator 40 is applied to mixing transformer 203 by means of coil 206. Secondary coils 207 and 208 are also coupled to transformer 203 to extract from there the mixed signals. Coils 207 and 208 are coupled to a pair of triode amplifiers 209 and 210 which are offset biased by batteries 213 and 213a for operation in the manner of a full-wave rectifier. The base wave 211, Fig. 6, of generator 40 preferably has a frequency corresponding to the desired cadence frequency T of the pulses to be produced.

Since tubes 209 and 210 operate in effect as a full-wave rectifier relative to the offset bias 211a caused by potentials 213 and 213a, an output wave of the form shown at 212 will be produced in the absence of any input signals. This wave is applied to a pulse shaper 214, Fig. 6, which clips and shapes the cusps of wave 212 to produce a plurality of pulses offset as indicated by the solid line pulses of pulse train 215, the pulses having a cadence frequency T as indicated. Upon application of energy from sources 51 and/or over channel connection 217, the offset bias of the push-pull circuit of tubes 209, 210 is varied producing pulses having substantially the same cadence frequency as before but displaced in "push-pull" between the maximum limits indicated by the broken line pulses 218 of pulse train 215. Thus, as the signals are applied to modulate the base wave, a time displacement of the pulses in the output of pulse shaper 214 is provided. While Fig. 6 discloses a modulator circuit for block 31 of Fig. 2, it is clear that the same type of modulator may be used in all of the different pulse generator and modulator circuits of the system. In channels in which no synchronizing signals are to be applied, synchronizing signal source 51 may be omitted. It is important, however, that the base wave generator be controlled or at least synchronized to the synchronizing signals of source 51 in order to provide for proper segregation or dropping of channel pulses at receivers in the system. For a further description of this type of modulator, reference may be made to the copending application of E. Labin and D. D. Grieg, Serial No. 455,897, filed August 24, 1942, now Patent No. 2,416,329, issued February 25, 1947. It will be understood, of course, that other forms of modulators may be used, also that the modulator if of the "push-pull" cusper type may be symmetrically biased as hereinbefore mentioned.

A typical demodulator circuit for time modulated pulses is shown in Fig. 7. This circuit corresponds to the combination deblocking selector and demodulator arrangement 62 hereinbefore referred to as a synchronizing and monitoring unit, Figs. 2, 3 and 4. It should be distinctly understood, however, that the demodulator 64 of this circuit may be used for demodulation in the other parts of the system.

According to the arrangement of Fig. 7, the train of pulses from line 63 in Fig. 2, for example, is fed over line 63a to mixer tube 220 of the deblocking selector 61. At the same time, deblocking pulses from deblocker oscillator 67 are fed to another separate grid of tube 200 over line 222. These deblocking pulses serve to produce, in conjunction with the incoming pulses timed to add thereto, an output series of pulses from tube 220. Assume, for example, that channel pulses of curve a, Fig. 1A, are applied to the selector 61, the deblocking oscillator will operate to produce a plurality of rectangular pulses 223, curve b, timed in spaced relation according to the pulses of channel 1. Tube 220 is also biased to serve as a clipper so that only the boosted pulses of channel 1 appear in the output thereof. A D. C. restorer rectifier tube 230 may be provided across the input from deblocking oscillator 67 to assure that the incoming deblocking pulses are of a proper level to work with the clipper circuit of tube 220 to leave only the desired output pulses above clipping level 228, curve b, Fig. 1A.

The output pulses from tube 220 have the same cadence frequency T as the original modulated pulses 215 from modulator 31, Fig. 6. The pulses are applied to one of the grids of a demodulator tube 240 and cause tuned circuit 241 connected to another grid of this tube to oscillate at a desired frequency producing in the output of tube 240 a combined wave in the form of a combination of the wave generated in 241 and the incoming pulses. Circuit 241 is preferably tuned to some harmonic of the cadence frequency of the input pulses so that as the pulse displacement is varied, due to the modulation signals, the output pulses will be raised to different levels depending upon their time displacement. Accordingly, in the output of tube 240 will appear a modulation envelope of pulses carrying signal modulations thereon. For a further understanding of the principles of this type demodulator reference may be had to the copending application of D. D. Grieg, Serial No. 459,959, filed September 28, 1942, now Patent No. 2,416,306 issued February 25, 1947.

A low-pass filter 245 is provided to remove from this demodulated signal envelope the pulses of higher frequencies that define the signal envelope. The output synchronizing signal is passed over filter 66 tuned to pass only the synchronizing frequency such as $f_2$, Fig. 2, which, in turn, serves to synchronize the operation of deblocking oscillator 67. The remaining demodulated frequencies of the input pulses are passed to a reproducer by filter 65 tuned to exclude the synchronizing signal frequency. It should be distinctly understood that in cases where the deblocking oscillator is not controlled directly by the channel to be selected, the deblocking pulses applied to tube 220 may be produced from a synchronizing signal of a different channel and retarded as by delay device 70, Fig. 2, to have a timing according to the pulses of the channel to be received.

While the pulse width selectors 165, 175 of Fig. 3 may comprise any circuit arrangement capable of segregating a pulse of a given width from pulses of greater and/or lesser widths, I have shown in Fig. 8, for purposes of illustration, a suitable circuit which, depending upon selection of circuit constants, is capable of distinguishing between two pulse widths differing by as little as one hundredth of a microsecond. Such fine distinction, however, is not necessary except where a very large number of different pulse widths are required between close limits.

The circuit of Fig. 8 preferably includes a limit clipping stage 250 as an input coupler which limits all input pulses to substantially the same amplitude. Should the input pulses be of a positive polarity as indicated by the pulses of curve 9a in Fig. 9, the coupler stage 250 also serves to reverse the polarity as indicated by the pulses of curve 9b. This output pulse energy from stage 250 is applied through a resistor R to a shock excitable L-C circuit 255. Connected across the tunable circuit 255 is a vacuum tube 260, the cathode 261 of which is connected to the input side of the circuit 255, while the anode 262 is connected to the opposite side 263 of the tunable circuit. The side 263 is also connected to a source of anode potential 264. The pulse energy, curve 9b, from the anode connection 254 is applied to the grid 265 of the tube 260 so as to block the conduction between the cathode 261 and the anode 262 while pulse energy is applied to the circuit 255. The undulations produced in the circuit 255 in response to pulse energy over anode connection 254 are taken off through a connection 270 for application to a threshold clipping amplifier stage 275. The bias on the grid 276 is controlled by adjustment of resistor 277. In the output 278 of stage 275 is a pulse width shaper 280 the operation of which is hereinafter described.

Assume for purposes of illustration, that the widths of the pulses of curves 9a and 9b correspond, respectively, to channels 1, 2, 3, 4 and 5 as indicated by the width reference characters $W_1$, $W_2$, $W_3$, $W_4$ and $W_5$. Assume also that the circuit 255 is tuned for selection of pulse width $W_3$. Curve 9c represents the output of the circuit 255 when the circuit 255 is tuned for selection of pulse width $W_3$, illustrating the different output undulations for the different pulse widths of curve 9a. When the leading edge 281 of the pulse $W_3$ is applied at negative polarity as indicated by curve 9b to the circuit 255, an initial undulation 282 is produced which is normally followed by undulations 283, 284 and so on in the form of a damped wave. When the circuit 255 is tuned to a frequency the period of which is exactly twice the width $W_3$, the trailing edge 286 occurs where the initiated oscillatory energy crosses the zero axis from undulation 282 to undulation 283. Since the trailing edge 286 shock excites the circuit in the same direction at this point, the undulation 287 produced thereby in the circuit 255 adds algebraically to the undulation 283 to produce undulation 290. The next succeeding pairs of undulations produced by the leading and trailing edges of pulse width $W_3$ would normally tend to produce a negative undulation 291 which would continue as a damped wave as indicated at 292. The damping tube 260, however, eliminates the trailing oscillations 292 so that they do not interfere with the undulations produced by subsequent pulses applied to the circuit 255.

A pulse width less than pulse width $W_3$ such, for example, as pulse widths $W_1$ and $W_2$, will not produce maximum undulations as great as the undulation 290 for the tuning adjustment corresponding to pulse width $W_3$. This is illustrated by the undulations 293 and 294 produced in response to the pulse widths $W_1$ and $W_2$, respectively. The reason for this is readily apparent because the shock excitations produced by the leading and trailing edges of the pulses of lesser width than $W_3$ are in part opposed to each other as indicated by the broken lines associated with the undulations 293 and 294. The undulations 295 and 296 produced in response to the greater pulse widths $W_4$ and $W_5$ are likewise smaller than the undulation 290 since here again the oscillations produced in response to the leading and trailing edges of the greater pulse widths are in part opposed to each other so that the algebriac summation thereof is less than in the case of the undulations produced in response to pulse width $W_3$.

The threshold clipping stage 275 is adjusted to clip at a level 297 thereby obtaining and amplifying the crest portion 290a of the undulation 290 as indicated by curve 9d. The pulse shaper 280 is preferably of the character adapted to differentiate the pulse 290a producing the pulse shape 290b of curve 9e. The shaper also includes a clipper stage for clipping the positive pulse portion of pulse shape 290b at level 299 thereby producing a narrow width pulse 290c synchronized in time to the pulse width $W_3$. Thus, any time modulation applied to the pulses of width $W_3$ will carry through to the output pulse 299c which may be demodulated to an audio wave by the demodulator 64 of Fig. 7. It will also be readily apparent that by adjusting the tuning of circuit 255 to another frequency the period of which is twice the duration of any one of the other pulse widths of curve 9a, that a corresponding output pulse will be produced representing the pulses of the pulse width selected.

Figure 11:
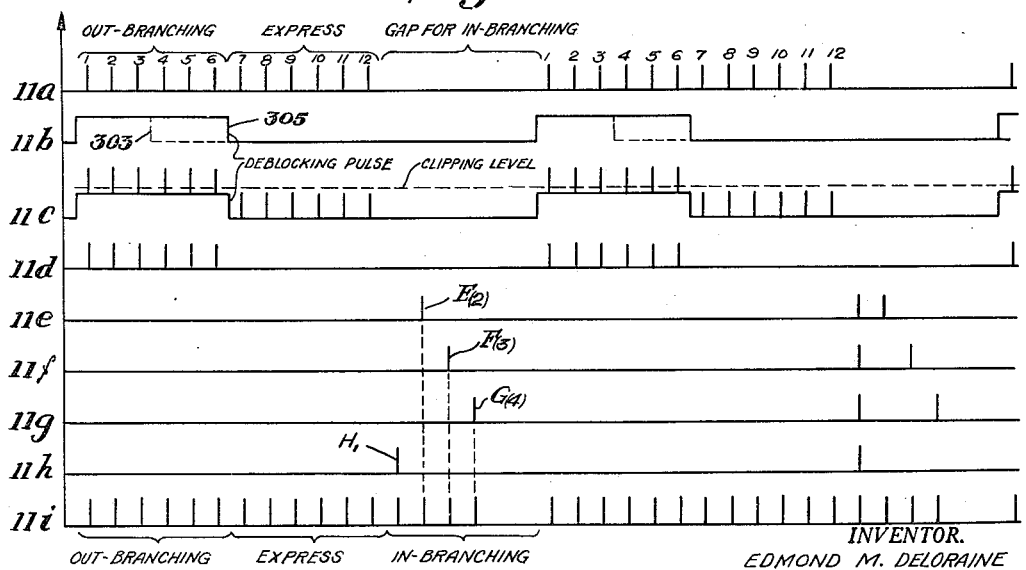
Fig. 11 is a graphical illustration used in explaining the channel pulse broadcasting and inserting features of the embodiment shown in Fig. 10.
Figure 10:
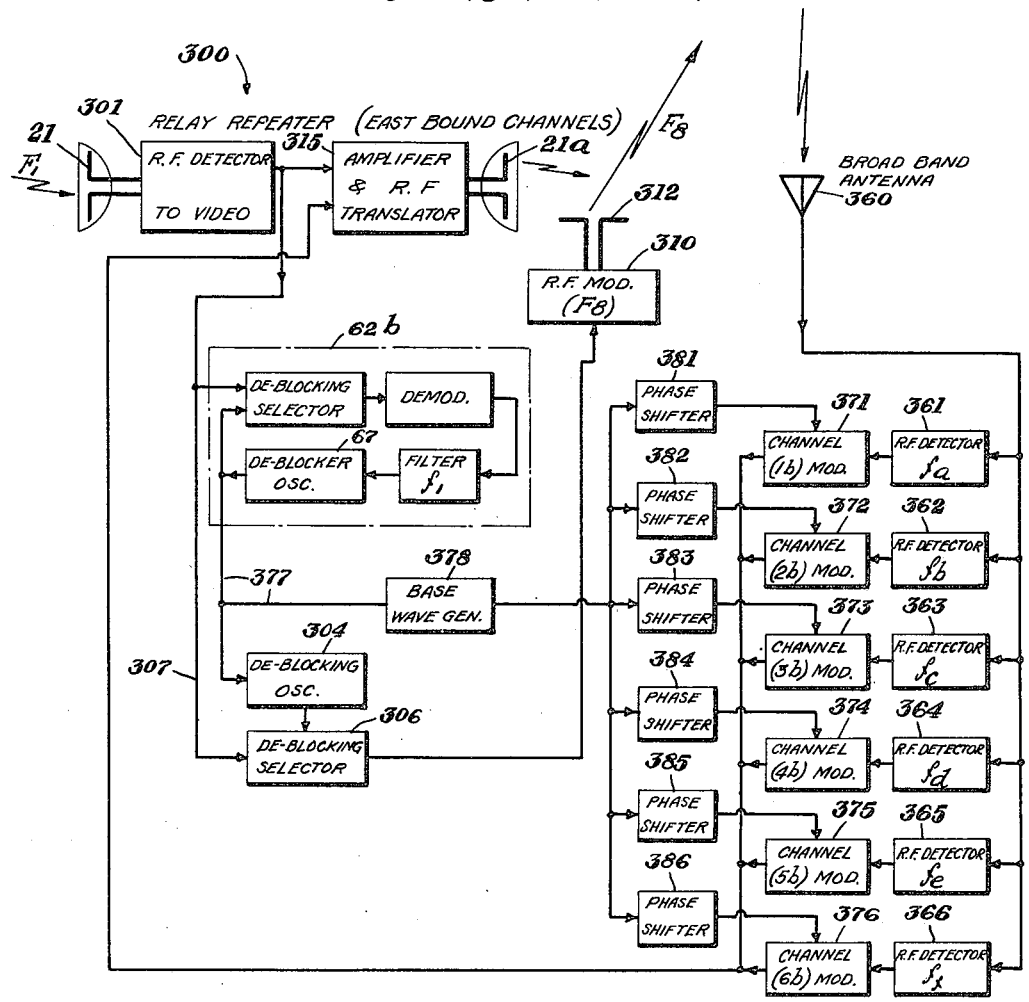
Fig. 10 is a block diagram of a modified form of equipment that may be used at relay stations where the channels of communication from the aircraft are to be inserted into the same train of channel pulses from which channel pulses are broadcast to the aircraft.
Figure 12:
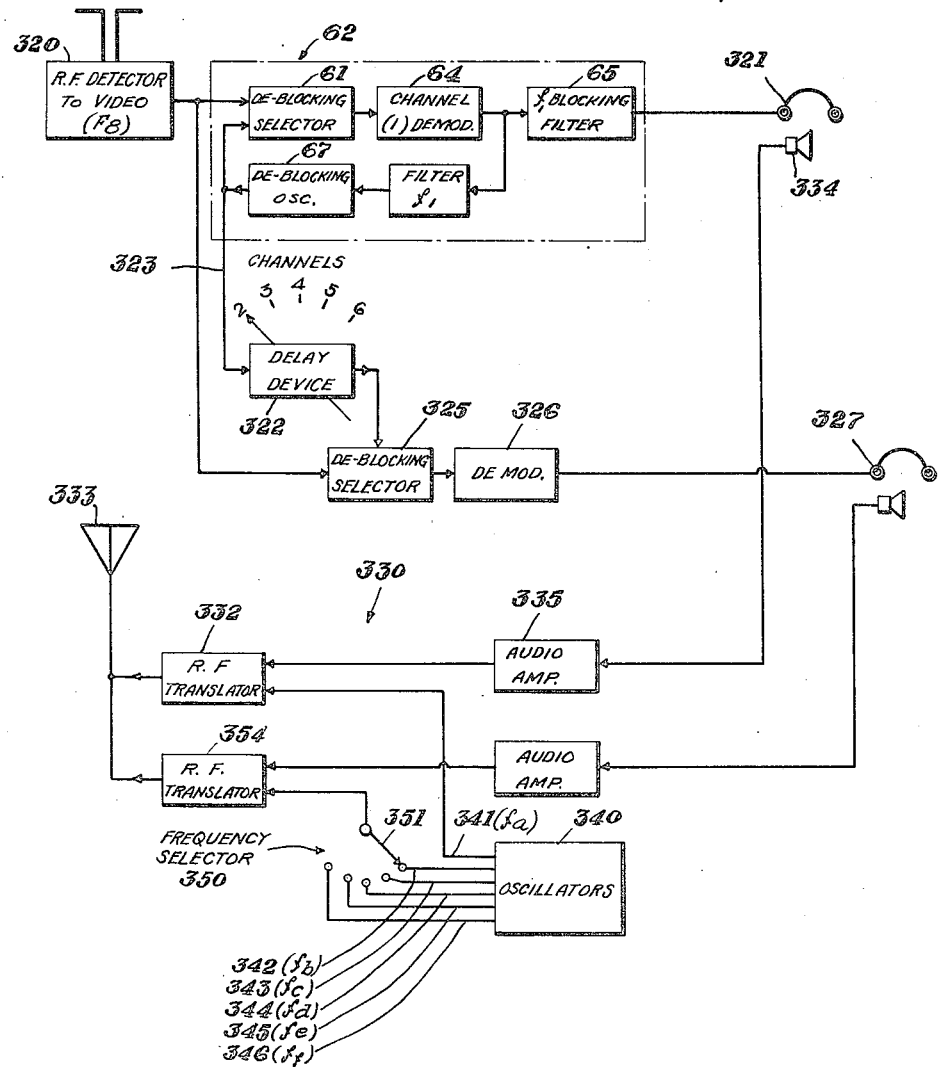
Fig. 12 is a block diagram of the aircraft equipment that may be used in coordination with the tower equipment illustrated in Fig. 10.

A second embodiment of the invention is disclosed in Figs. 10, 11 and 12. This embodiment provides for broadcasting the outbranching channels only at the relay stations, the express channels being transmitted on the narrow beam from relay station to relay station, and for inserting inbranching channels on the same chain of channel pulses containing the above-mentioned outbranching channels.

In Fig. 10, the relay repeater 300 for east bound channels is shown to include an R.-F. detector 301 wherein the pulses of carrier frequency $F_1$ are translated into video form and applied to deblocking pulse producer 62b, the elements of which are identical to the corresponding elements of the synchronizing and monitoring unit 62 of Fig. 2 except that here the audio of channel 1 is not segregated by a second filter. The deblocking pulse produced by the deblocking oscillator 67 is applied to a second deblocking oscillator 304 adjusted to produce a deblocking pulse 305 of a duration sufficient to deblock all of the outbranching channels 1 to 6 (see curves 11a to 11d of Fig. 11).

If desired, the oscillator 304 may be adjusted to provide deblocking pulses of lesser width as indicated by the broken lines 303, thereby selecting the pulses of channels 1, 2 and 3 for broadcasting at such relay station. This selection may be different for different relay stations or blocks of such stations thereby limiting the broadcasting at certain relay stations to certain selected outbranching channels.

The deblocking pulses produced by oscillator 304 are applied to a deblocking selector 306 to which the video pulses of the detector 301 are applied over connection 307. The deblocking pulses 305 thus condition the selector 306 to pass the outbranching channel pulses 1 to 6 for translation to R.-F. frequency $F_3$ by translator 310 for radiation over wide angle antenna 312.

It will be understood, of course, that the outbranching as well as the express channels are applied from the detector 301 to the amplifier and R.-F. translator 315 and radiated over directive antenna 21a in the manner heretofore described. Thus, the tower equipment is capable of selecting the outbranching channels at each tower and for wide angle radiation distinct from the directional repeating function of the repeater equipment.

Referring now to Fig. 12, the aircraft communicating equipment is shown to comprise an R.-F. detector 320 whereby the outbranching channel pulses transmitted by the tower antenna 312, Fig. 10, are received and translated into video form. The video pulses are applied to a synchronizing unit 62 identical to that used in Fig. 2 whereby the synchronizing signal of channel 1 synchronizes the receiver equipment to the timing relationship of the outbranching channel pulses. As hereinbefore described the deblocking oscillator 67 produces a deblocking pulse timed to each pulse of channel 1 so that the selector 61 will pass the pulses of channel 1 which are demodulated at 64 and the audio signals thereof passed by filter 65 to earphones 321. The deblocking pulses produced by the oscillator 67 are applied to an adjustable delay device 322 over connection 323 where the deblocking pulses are delayed a selective amount depending on the adjustment for deblocking a selected one of the outbranching channels 2, 3, 4, 5 and 6. For minimum weight the device 323 is preferably of the pulse translation type rather than the network type. As shown, the device 322 is adjusted to provide a delay sufficient to time the deblocking pulses for the pulses of channel 2 so that by application of the delayed deblocking pulses to selector 325, the selector will pass only pulses of channel 2. The channel 2 pulses are then demodulated by demodulator 326 and the output thereof applied to earphones 327.

It will be readily apparent from the foregoing description that by changing the adjustment of the delay device 322 reception may be had over any one of the channels 2 to 6. In normal operation, the operator at the base terminal will designate over an order channel, in this case channel 1, which channel the operator at the plane is to receive a message and also which channel he may use in replying to same. Should the inbranching channel designated be channel 5, the delay device 322 would be changed to the adjustment No. 5 and the phone 327 would then receive messages coming over channel 5. This adjustment of the device 322 would preferably be by some simple step by step system.

The transmitting equipment 330 for the aircraft is shown in this embodiment, by way of a further example, to comprise A.M. modulation of carrier waves, a different carrier wave being selected for each channel. Inbranching channel 1, or in other words the order channel from aircraft to terminal, is transmitted by an R.-F. translator 332 coupled to an antenna 333, to which voice or other intelligence signal is applied over microphone 334 and audio amplifier 335. The carrier wave is supplied by a bank of oscillators 340. Output connection 341 provides a carrier frequency $f_a$ for inbranching channel 1. This frequency is applied to the translator 332 and thus serves as the carrier for the intelligence received at microphone 334. The output connections 342 through connection 346 provide carrier frequencies $f_b$, $f_c$, $f_d$, $f_e$ and $f_f$, respectively, to frequency selector 350 where, by a movable contact 351 or other selective arrangement, selective connection with one or the other of the output connections 342 to 346 may be made for application of the carrier energy thereof to R.-F. translator 354. It will thus be clear that by proper selection of the carrier, a reply to conversation received over any one of the outbranching channels 2 to 6 may be made over any designated inbranching channel frequency.

Turning back to Fig. 10, the transmission of the inbranching channel carriers from the aircraft equipment of Fig. 12 is received over broad band antenna 360 which is coupled to R.-F. detectors 361 through 366. The detector 361 is tuned for narrow band reception of carrier wave $f_a$, the audio output of which is applied to an inbranching channel modulator 371 for channel 1b. The other inbranching carriers $f_b$, $f_c$, etc., are likewise detected to audio and applied to modulators 372, 373, etc.

The employment of A.M. modulation for the inbranching channels raises the question of "fading" due to variation of the distance between the plane and receiving towers. This difficulty, of course, may be compensated for by using A.V.C. circuit.

In order to insert the channel pulses of modulators 371 to 376 in a given gap in the train of channel pulses, curve 11a, of Fig. 11, it is important to synchronize the pulse generating function of the modulators. This is accomplished by applying the deblocking pulse of oscillator 67, Fig. 10, over connection 377 to a base wave generator 378, the output of which is applied to a bank of phase shifters 381 to 386. The base wave produced by generator 378 may thus be shifted in phase for application to each of the different modulators 371 to 376. As hereinbefore described in connection with Fig. 6, the timing of the pulses produced by the different modulators is controlled so that the inbranching pulses will interleave together into the gap shown in Fig. 11a.

It will be understood, of course, that a plane can according to the illustration of the transmitter 330 in Fig. 12 transmit two channels at a time, one an order channel and the other a selected communication channel. According to the embodiment illustrated, five planes can transmit intelligence simultaneously over channels separate from the order channel to the base terminal or to other points in the system. Curves 11e 11f and 11g represent three busy inbranching channels from planes E, F and G, the second, third and fourth inbranching channels being used, respectively. These inbranching channel pulses may be received by the same equipment on a given tower or by the equipment from a different tower, the synchronization thereof being controlled by the order channel 1 from the base terminal. The inbranching order channel is shown to be occupied by the transmitter equipment on plane H by the channel pulse shown in curve 11h. The fifth and sixth inbranching channels are shown to be unoccupied. Should two or more planes try to occupy the inbranching order channel simultaneously, some confusion may result but this may be overcome by the operator at the base terminal designating which plane is to use the order channel.

Since the inbranching channel pulses are inserted in the same east bound train of channel pulses having the outbranching channel pulses, express channels from the east to west terminals will be used, in this embodiment, for the inbranching order channel and other inbranching channels that must be trunked to or through the west terminal. This trunking of the channels from east to west will be obvious to those skilled in the communication art and therefore need not be illustrated for a clear understanding of the invention.

Figs. 13 to 18 illustrate a further embodiment of the invention wherein the operator at the west terminal is capable of transmitting a selected channel to a selected relay tower for transmission from such tower independent of other relay towers for aircraft reception, and whereby inbranching signals from the aircraft may be received by such tower and translated into signal modulated pulses to replace the pulses of the channel broadcast at such tower.

Fig. 13 shows the west terminal equipment which, as in the case of the terminal equipment of Fig. 2, may comprise a switchboard 400 from which signals for the different channels are applied to the respective channel pulse generating and shaping equipment for transmission by common pulse amplifier 408 and R.-F. translator 409. The signals for channel 1 are applied to a pulse generator and modulator 402 which may be of the character shown in detail in Fig. 6. The base wave for the modulator is produced by generator 405. A pulse shaper 406 provides the pulses of channel 1 with a given width $T_0$ which operates as the order channel for the system and is broadcast by each of the relay towers. The pulse width for channel 1 is indicated by curve 14a, Fig. 14, in comparison with a few other relative pulse widths that may be used for channels 2 to 6.

The pulses of channel 2 are generated by pulse generator and modulator 412, the base wave being supplied thereto from generator 405 through phase shifter 410 to provide the pulses generated with the proper timing with respect to the pulses of channel 1. The pulses for channel 3 through channel N are likewise produced at different timings so that they all interleave in the manner illustrated in curve 14a. The pulse shaper and width selector 415 is adjustable to shape the pulses of channel 2 for different widths. The other outbranching channels 3, 4, 5 and 6 are likewise provided with pulse shaper and width selectors similar to selector 415. This width selection determines the tower relay station at which the pulses of the channels 2, 3, 4, 5 or 6 are to be segregated from the pulses of other channels and broadcast to aircraft in the vicinity of such tower. Instead of just one tower a given block of towers may be made receptive to a given pulse width. It will be understood, therefore, that where the width selection is described per tower that this may be taken to mean "a block of towers" if desired. Curve 14a, for example, shows channel 2 of pulse width $T_1$ and this means that the pulses of channel 2 will be broadcast for aircraft reception at tower $T_1$ or a given block of towers known as tower block $T_1$. Curve 14a further shows channel 3 of a pulse width for broadcasting at tower $T_6$, channel 4 for tower $T_3$ and channel 5 for tower $T_{10}$. Channel 6, however, is not shown in use, therefore no pulse is shown in the time position of channel 6. If a channel is not in use the base wave to the modulator of the channel may be discontinued by opening switch 416 (see channel 2, Fig. 13). Channels 7 to N are shown to be occupied by narrow width pulses narrower than the narrowest outbranching channel. This difference of the express channel pulse widths from the outbranching channel pulse widths insures that the express channels will not be broadcast, suppressed or otherwise interfered with at the relay stations. It should be understood that the pulse widths shown are relative and are exaggerated for clarity of illustration. Under actual practice the width 5, as hereinbefore stated, may differ by only a fraction of a microsecond.

Fig. 15 shows the relay equipment for tower $T_1$. The train of R.-F. pulses is detected by detector 420 and the video output thereof is applied to a channel suppressor 421 thence to a coupling amplifier 422 and finally to an R.-F. translator 423 whereby the pulses are applied to a carrier for transmission to the next relay station in the manner hereinbefore described. The video pulse output of detector 420 is applied over connection 425 to a pulse width selector 426. This selector may be of the character described in connection with Figs. 8 and 9 whereby a particular pulse width $T_0$, for example, may be segregated from the other pulse widths present. A pulse width shaper 427 may be provided at the output of selector 426 to reshape the pulse to the width $T_0$ or to any other pulse width desired. The output of the shaper 427 may then be applied to coupler 428 for application to R.-F. translator 430 for transmission over wide angle antenna 432.

A second pulse width selector 437 is provided to which the video pulses of detector 420 are applied. This pulse selector is adjusted for pulse width $T_1$. The output of the selector 437 is applied over connection 438 to coupler 428 for broadcasting along with the channel pulses of width $T_0$. These pulses from selector 437, however, need not be reshaped to the initial width although they may if desired.

Before completing the description of Fig. 15, reference is made to Fig. 16 which illustrates the receiver equipment for aircraft. The receiver includes an R.-F. detector 440 which translates the signal pulses to video for application to a pulse width selector 442. The selector 442 is adjusted for pulse width $T_0$ so as to select only the order channel which is demodulated to audio at 443 and then reproduced at earphones 444. The selector reception of the other outbranching channels 2 to 6 is controlled by an adjustable delay device 450 preferably of the tube circuit type to which the pulse output of selector 442 is applied. The device 450 is adjustable to five different positions one for each of the channels 2 to 5 for providing the desired delay to the pulses from selector 442 so that they may be used as deblocking pulses for the deblocking selector 452. A pulse width shaper 445 is included to provide a proper pulse width sufficient to deblock the selector 452 for passage of pulses of channel 2 or which other channel that may be initially transmitted of width $T_1$.

When an order comes through from the west terminal to the aircraft over channel 1 to the earphones 444, Fig. 16, for separate communication over a given one of the channels 2 to 5, the adjustment of the device 450 to the proper delay position will cause the selector 452 to pass the pulses of the proper channel according to the time differential thereof with respect to channel 1. The audio with which the channel pulses are modulated is then demodulated by demodulator 453 for reception over earphones 454.

For transmission from the aircraft to the tower relay station, the same transmitter equipment 333 disclosed in Fig. 12 may be used.

The receiver equipment at the tower, Fig. 15, includes broad band antenna 460 and a pair of R.-F. detectors 461 and 462 with which the antenna is coupled. The frequency of the carriers may be in the same order described in connection with transmitter 330 in Fig. 12. The carrier $f_a$, for example, will correspond to the inbranching order channel as hereinbefore described and may be received by the first detector 461. The additional carrier waves, however, are so selected (one per tower) that only one of them such as $f_b$ is receivable by the detector 462. Thus, the carrier $f_b$ corresponds to tower $T_1$ and will be received only by such tower. These carrier frequencies, however, need not be multiplied to any greater number than illustrated in Fig. 12 since they may be repeated along the chain of relay tower stations, the carrier $f_b$, for example, being the carrier receivable by the first, sixth, eleventh and sixteenth, etc., towers.

The inbranching channel signals being detected to audio at the detectors 461 and 462 are thus applied to the pulse generator and modulator units 471 and 472, respectively. The channel pulses produced by the units 471 and 472 may be inserted in gaps in the pulse train or the channel pulses broadcast by the translator 430 may be suppressed and their position in the train of pulses taken by the channel pulses produced by the modulators 471 and 472. For purposes of illustration, the outbranching channel pulse of width $T_1$ is suppressed at tower $T_1$ and the gap left thereby filled by the channel pulse produced by modulator 472. The inbranching order channel from the aircraft, the pulses of which are produced by modulator 471, may be applied to the same position as the outbranching order channel or it may be timed for insertion at a different channel position such as channel 8, for example.

Referring particularly to Figs. 14, 15 and 17, the suppression of outbranching channel 2 of width $T_1$ will now be described. The video output pulse of selector 437, Fig. 15, may be employed for this purpose by pulse widening, reversing in polarity and controlling the timing of the widened pulses for blocking the pulses of channel 2. For example, however, the blocking pulses are produced from a base wave generator 474 controlled by the pulse output of selector 426, although, if desired, it may be controlled by the output of selector 437. The base wave is shifted for proper timing by phase shifter 475 and applied over line 476 to blocking pulse generator 477. The generator 477 may be of any suitable character and, for example, may be of the type shown in Fig. 6, the output pulses being shaped and reversed in polarity by clipper and amplifying circuits of known character. The blocking wave 485, produced by generator 477, is indicated in Fig. 17 and curve 14b, Fig. 14.

The suppressor circuit 421, Fig. 17, comprises a pair of vacuum tubes 481, 482. Into tube 481 is fed the incoming pulse train 483 from detector 420 (see also curve 14a, Fig. 14), while the blocking wave 485 is fed into tube 482. The two plate and cathode circuits of tubes 481, 482 are connected in parallel producing a resultant output wave 485 across the common cathode resistance 483 shown by curve 14b. This resultant wave is fed over coupling condenser 486 to clipper tube 487. A sufficient bias is applied to the grid of tube 487 over resistor 488 so that only the pulses lowered by wave 485 are rejected. At the input of tube 482 is provided the usual grid resistance 490 shunted by a rectifier 491. The rectifier 491 is usually known as a D.-C. restorer and serves to assure that the maximum amplitude of wave 485 is at all times of the same value. By having this value fixed, the clipping action of tube 487 may be properly adjusted to only clip so much of wave of curve 14b as is necessary to produce the desired resultant output pulses as indicated above clipping level 493.

The pulse train output of the suppressor circuit 421 is applied to coupling amplifier 422 together with inbranching pulses from modulators 471 and 472. The inbranching channel pulse 2a is inserted into the gap caused by suppression of the outbranching channel pulse 2. The timing of the inserted pulse is accomplished in a manner similar to generation of the blocking pulse wave 485. The base wave of generator 474 is taken after passing phase shifter 475 and applied to modulator 472 thereby timing the pulses of inbranching channel 2a to coincide substantially with the phase position of the pulses of channel 2 now suppressed.

The pulses of inbranching channel 1a which comprise the order channel from the aircraft may be controlled directly by the base wave from generator 474 for insertion in a given outbranching channel position by proper phasing of the base wave by phase shifter 496. In curve 14c of Fig. 14, the inbranching order channel is shown to be timed for insertion at channel position 8 as indicated by the pulse 8o. Curve 14d shows the final train of pulses appearing at the output of amplifier 422, Fig. 15.

While the embodiment of Figs. 13 to 17 utilizes different pulse widths for distinguishing tower destination of the outbranching channel pulses, it will be clear from the embodiments illustrated in Figs. 2 to 12 that different frequency signals may be employed for the same purpose. In such case, the pulse width selectors 426 and 437 of Fig. 15 will, of course, be replaced by a synchronizing unit arrangement similar to the unit 62 and an associated deblocking selector utilizing delay device 70 such as shown in Fig. 2. It will also be appreciated that instead of using synchronizing frequency signals in the embodiments of Figs. 2 to 12 for synchronizing and monitoring purposes that the width of pulses of channel 1 may be made different from other channel pulses and such pulse width distinction used as the synchronizing and monitoring signal for the pulse train.

While I have described above the principles of my invention particularly in connection with aircraft, it will be understood that the same principles are applicable to ships, railroad trains, automobiles, etc. In connection with railroads, for example, the system permits direct communication between the conductor, engineer or other trainmen and railroad stations or other points along the railroad and with trainmen on other trains. Such a system, if installed on the railroads, would be instrumental in preventing railroad accidents. It is to be clearly understood, therefore, that this description is made only by way of example and not as a limitation on my invention and the scope of the accompanying claims.

I claim:

1. A radio communication system for moving vehicles comprising a terminal station including means for transmitting and receiving time modulated pulses, the pulses of different communicating channels being interleaved in a single train, a chain of repeaters extending along the path of said vehicles, and means carried by a vehicle moving along said path for receiving the pulses of certain of said channels transmitted from said terminal station by way of certain of said repeaters.

2. A system in accordance with claim 1 wherein a terminal station is provided at both ends of said chain of repeaters, said terminal stations and said repeaters include means to interleave the pulse signals of different channels, and means is provided for transmitting a signal over one channel from one terminal station to the other and for transmitting another signal over another channel from one terminal to a vehicle moving along said path.

3. A radio communication system for communicating with moving vehicles comprising a terminal station including means for transmitting and receiving time modulated pulses, the pulses of different communicating channels being interleaved in a single train a chain of directional repeaters extending along the path of said vehicles, wide angle transmitters connected to certain of said repeaters including means for transmitting at a wide angle the pulse signals of certain of said channels, and means at said terminal station for operating simultaneously a plurality of said wide angle transmitters to communicate with a vehicle moving along said path.

4. A system in accordance with claim 3 wherein said chain of repeaters extends between said terminal station and a second terminal station, both terminal stations and said repeaters including means for interleaving the pulse signals of different channels, means is provided for communicating from one to the other of the two terminal stations over one channel, and means is provided for communicating from one of said terminal stations to a vehicle within range of one of said wide angle transmitters over another channel.

5. A radio communication system for communication with moving vehicles comprising a plurality of terminal stations, a chain of directional pulse repeaters extending between said stations along the path of said vehicles, means for transmitting from one of said stations a plurality of groups of interleaved time modulated pulses, each group constituting a separate communication channel, means at another of said stations for receiving one of said groups of pulses, and means carried by a vehicle in said path for receiving another of said groups of pulses.

6. A system in accordance with claim 5 wherein said directional repeaters are of the narrow beam type, wide angle transmitters are associated with certain of said repeaters for communicating with said vehicles, and means is provided for energizing said transmitters in response to certain of said groups of pulses.

7. A radio communication system for communication with moving vehicles comprising a terminal station, a chain of directional multi-channel pulse repeaters extending from said station along the path of travel of said vehicles, means at said station for transmitting a plurality of groups of interleaved time modulated pulses, each group of pulses representing a different channel; wide angle transmitters associated with certain of said repeaters, and means for causing pulses of certain of said channels to operate said transmitters whereby signals from said station can be sent by way of said transmitters to said vehicles.

8. A radio communication system for communication with moving vehicles comprising a terminal station including means for transmitting and receiving time modulated pulses, the pulses of different communicating channels being interleaved in a single train, a chain of directional multi-channel repeaters extending from said station along the path of travel of said vehicles, wide angle transmitters associated with certain of said repeaters, means for causing signals sent from said terminal station over one of said channels to operate one of said transmitters, and means for causing signals sent from said terminal station over another of said channels to operate another of said transmitters.

9. A radio communication system comprising a terminal communicating unit for transmitting and receiving pulse time modulated signals, a transmission link including a chain of repeaters, a plurality of mobile communicating units, and means including said repeaters for effecting selective communication between said terminal unit and any desired one of said mobile units while the latter are moving generally along the line of said chain of repeaters.

10. A system according to claim 9 wherein said means includes means for effecting simultaneous communication between said terminal unit and any two of said mobile units.

11. A system according to claim 9 further including means for effecting communication between any two of said mobile units, said last-named means including at least certain of said repeaters as part of the transmission link between the two mobile units.

12. A radio communication system for moving vehicles comprising a terminal station having pulse time modulation transmitting and receiving means, the signals of different channels of communication in a given direction being interleaved together in a single train, a chain of first multi-channel repeaters for relaying a plurality of outgoing communication channels, wide angle transmitters associated with certain of said first repeaters, a chain of second multi-channel pulse repeaters for relaying a plurality of incoming communication channels, wide angle receiving means associated with certain of said second repeaters, means on a vehicle for transmitting a call signal to said receiving means, means in said receiving means for passing said call signal over a predetermined incoming order channel over said second repeaters to advise said terminal station that the vehicle has a message for said terminal station, means for transmitting from said terminal station over a predetermined outgoing order channel over said first repeaters to said wide angle transmitters and thence to the vehicle a go ahead signal assigning a particular outgoing and incoming communication channel over said first and second repeaters, respectively.

13. A system in accordance with claim 12 including means at the terminal station for transferring a signal incoming from one vehicle over one incoming channel to an outgoing channel for transmission to another vehicle.

14. A system in accordance with claim 12 wherein said chains of repeaters extend between said terminal station and a second terminal station, means is provided for connecting certain of said channels as express channels directly between said terminal stations, and means is provided for segregating other of said channels for communication between a vehicle and one of said terminal stations.

15. A system in accordance with claim 12 wherein transmitters of successive repeaters are tuned to transmit at different frequencies for the respective outgoing and incoming channels and said wide angle transmitters are tuned to transmit to the vehicles at a frequency different from that employed for transmission between the repeaters.

16. A system in accordance with claim 12 wherein transmitters of successive repeaters are tuned to transmit at different frequencies for the respective outgoing and incoming channels and the transmitter means on the vehicle is tuned to transmit to the said wide angle receivers at a frequency different from those used for transmission between said repeaters.

17. A system in accordance with claim 12 wherein each vehicle is provided with receiving and transmitting means for communication over said order channels and wherein each vehicle has in addition means for communication over separate specific channels.

18. A system in accordance with claim 12 wherein said means on said vehicle for transmitting a call signal is of the continuously modulated type.

19. A system in accordance with claim 12 wherein said means on said vehicle for transmitting a call signal is of the amplitude modulated type.

20. A radio communication system for moving vehicles comprising a terminal station having means for receiving time modulated pulses of different channels interleaved together in the form of a single train of pulses, a chain of directional repeaters extending along the path of said vehicles and having means for repeating time modulated pulse trains, receivers associated with certain of said repeaters for receiving time modulated pulse signals from a vehicle moving along said path, said repeaters including means for interleaving the received signals into the single pulse train, and means for transmitting the received signals through the associated repeater to said terminal station.

21. A system in accordance with claim 20 wherein means is provided for preventing signal mutilation at the terminal station resulting from interference between the signal received by one of said receivers and that received by another of said receivers.

22. A system in accordance with claim 20 wherein each of said receivers includes a detector for detecting the original signal sent from the vehicle and said transmitting means includes means for translating the detected output from each of said receivers into carrier form for transmission through the associated repeater in said single train to said terminal stations.

23. A system in accordance with claim 20 wherein said receivers include means to receive continuously modulated signal energy, means for translating said continuously modulated signal energy into time modulated pulses, and means for applying said time modulated pulses to said repeaters for predetermined positioning in said train of pulses.

24. A system in accordance with claim 20 wherein said receivers include means to receive amplitude modulated energy, means for translating the amplitude modulated energy into time modulated pulses, and means for applying said time modulated pulses to said repeaters for predetermined positioning in said train of pulses.

25. A radio communication system for communication with moving vehicles comprising a plurality of terminal stations, a chain of directional pulse repeaters extending between said stations along the path of said vehicles, means for transmitting from one of said stations a plurality of groups of pulses, the pulses of different groups being of different widths, each different width representing a separate communication channel, means at another of said stations for receiving the pulses of a certain width, and means carried by a vehicle in said path for receiving the pulses of a different width.

26. A radio communication system for communication with moving vehicles comprising a plurality of terminal stations, a chain of directional pulse repeaters extending between said stations along the path of said vehicles, wide angle transmitters associated with certain of said repeaters for communicating with said vehicles, means for transmitting from one of said stations directly to the other of said stations groups of pulses of a certain width constituting express communication channels, means for transmitting from said one of said stations a plurality of groups of pulses of different widths constituting separate outbranching communication channels, said different widths differing from said certain width, and means associated with each of said wide angle transmitters for selecting only pulses of a given predetermined width for transmission to said vehicles, the width of the signals selected by said means last mentioned being within the widths of the pulses of said outbranching channels and different for each of said transmitters, whereby outbranching signals can be transmitted from a predetermined one of said transmitters by width selection.

27. A system in accordance with claim 26 wherein said means associated with each of said wide angle transmitters includes means for selecting the pulses of another predetermined width for transmission to said vehicles, whereby one selected channel may be used as a continuous communicating link and the other selected channel reserved for particular messages.

28. A radio communication system for moving vehicles comprising a terminal station, a chain of directional repeaters extending along the path of said vehicles, receivers associated with certain of said repeaters for receiving signals from vehicles moving along said path, means to translate the received signals into a plurality of series of pulse carriers each of a different frequency representing a different channel of communication, said carriers having a given frequency relationship one to the other, and means to transmit the carriers along the chain of repeaters to said terminal.

29. A communication system according to claim 28 wherein the means for translating the received signals includes means to produce groups of differently timed carrier pulses, and means to vary a given characteristic of the pulses of each group according to the instantaneous value of the signal energy of the corresponding channel.

30. A communication system according to claim 28 wherein said receiver means includes a given number of separate circuits for a like number of channels to be received, each of said circuits having means for passing energy of one only of a like number of different signal carriers, and each vehicle is provided with means selective of any desired one of said signal carriers for transmitting signals.

31. A communication system according to claim 28 wherein said receiver means includes a given number of separate circuits for a like number of channels to be received, each of said circuits having means for passing pulse energy of one only of a like number of different pulse widths, and each vehicle is provided with means selective of any desired one of said different pulse widths for transmitting signals as a series of signal modulated pulses.

32. A communication system according to claim 28 wherein said receiver means includes a given number of separate circuits for a like number of channels to be received, each of said circuits having means for passing energy of one only of a like number of different carrier frequencies, and each vehicle is provided with means selective of any desired one of said carrier frequencies for transmitting signals.

33. A radio communication system for moving vehicles comprising a terminal station, a chain of directional repeaters extending along the path of said vehicles, said repeaters being arranged to relay a train of channel pulses wherein the pulses of different channels are interleaved in sequence and the pulses of one of the channels are distinctive with respect to pulses of the other channels, receivers associated with certain of said repeaters for receiving signals from vehicles moving along said path, means to translate the received signals from each vehicle into a group of pulses, means to vary a given characteristic of the pulses of each group according to the instantaneous value of the signals received from the corresponding vehicle, and means synchronized by the pulses of said one channel for timing the occurrence of the pulses of each group for proper interleaving into the train of channel pulses.

34. The communicating system according to claim 33 further including means at a selected repeater for broadcasting certain of the channel pulses for reception at vehicles within the range of such repeater, means controlled by said synchronized means to suppress further transmission along said chain of repeaters of the pulses thus broadcast and to substitute in their place in said train of channel pulses the pulses produced from signals received from the vehicles.

35. In a communication system utilizing pulses, certain of said pulses having different distinguishable characteristics and comprising a chain of relay stations, each of said relay stations having receiving means for diverting from the relayed pulses energy of those pulses having a characteristic different from the pulse characteristics divertible by other relay stations, and means selective of any one of the different pulse characteristics for transmitting pulses of a desired characteristic along said chain.

36. A communicating system according to claim 35 wherein said receiving means distinguishes pulses by differences in pulse width and said selective means is adjustable as to the width of pulses transmitted.

37. A method of communicating between a given station and vehicles moving along a chain of directional repeaters associated with said station; comprising relaying signals from said station along said chain of repeaters, transmitting the signals at a wide radiation angle at least certain of said repeaters for reception by vehicles in the range of said certain repeaters, transmitting signals from said vehicles, detecting the signals at nearby repeaters, translating the signals from the different vehicles into differently timed pulses, and relaying the pulses along said chain of repeaters.

38. A method of inserting signals from moving vehicles into a transmission system including a chain of repeaters disposed along the path of vehicle travel; comprising transmitting signals from said vehicles, detecting the signals at nearby repeaters, translating the signals from the different vehicles into differently timed pulses, and relaying the pulses along said chain of repeaters.

39. A method of communicating between a communication system and moving vehicles wherein the system includes two terminals having a chain of directional repeaters therebetween disposed along the path of travel of said vehicles; comprising relaying "through" channels along said chain of repeaters between said terminals, relaying other channels from at least one of said terminals along said chain of repeaters, and transmitting said other channels at wide radiation angles from at least certain of said repeaters for reception by the vehicles within the range of such repeaters.

40. A method according to claim 39 wherein said "through" channels and said other channels are each represented by a group of pulses, the pulses of the different groups being interleaved together in a single train; the method further including transmitting signals from said vehicles, detecting the signals at nearby repeaters, translating the signals from the different vehicles into differently timed pulses, and interleaving the produced pulses with the pulses of said train.

41. A method of communicating between a communication system and moving vehicles wherein the system includes a terminal and a two-way chain of directional repeaters disposed along the path of travel of said vehicles; comprising relaying signals from said terminal in one direction along said chain of repeaters, transmitting the signals at a wide radiation angle at at least certain of said repeaters for reception by vehicles in the range of said certain repeaters, transmitting return signals from said vehicles, and relaying said return signals in the opposite direction along said chain of repeaters.

42. A method according to claim 41 wherein the two-way relaying operations each includes a relaying of multi-channel signals the channels each being represented by a group of pulses with the pulses of different channels interleaved together in a single train, maintaining one of the channels in each relaying direction as an order order channel, and reserving a plurality of the other channels in each relaying direction selective for additional transmission of signals between said terminal and said vehicles.

43. A method of communicating between two vehicles travelling along a chain of directional repeaters associated with a terminal station; comprising transmitting signals from one of said vehicles, detecting the signals at a nearby repeater and relaying the signals along said chain of repeaters to said terminal station, relaying said signals back along said chain of repeaters, and transmitting said signals at a wide radiation angle at at least certain of said repeaters for reception by the other of said vehicles.

44. A method of communicating from a given station to vehicles along a chain of directional repeaters associated with said station; comprising relaying a train of time modulated pulse signals in which the pulses of different channels are interleaved together to form a single train of pulses along said chain of repeaters and separating and transmitting the pulses of certain of said channels at a wide radiation angle to certain of said repeaters.

EDMOND M. DELORAINE.

REFERENCES CITED

The following references are of record in the file of this patent:

UNITED STATES PATENTS

| Number | Name | Date |
| --- | --- | --- |
| 1,758,570 | Gauthier | May 13, 1930 |
| 1,894,019 | Buckley | Jan. 10, 1933 |
| 2,017,126 | Kroger | Oct. 15, 1935 |
| 2,064,907 | Green | Dec. 22, 1936 |
| 2,155,821 | Goldsmith | Apr. 25, 1939 |
| 2,262,838 | Deloraine et al. | Nov. 18, 1941 |
| 2,266,401 | Reeves | Dec. 16, 1941 |
| 2,273,193 | Heising | Feb. 17, 1942 |
| 2,275,224 | Henroteau | Mar. 3, 1942 |
| 2,292,222 | Haigis | Aug. 4, 1942 |
| 2,298,409 | Peterson | Oct. 13, 1942 |
| 2,298,435 | Tunick | Oct. 13, 1942 |
| 2,406,165 | Schroeder | Aug. 20, 1946 |